US012712192B2

(12) United States Patent
Nana et al.

(10) Patent No.: US 12,712,192 B2
(45) Date of Patent: Aug. 18, 2026

(54) SYSTEMS AND METHODS FOR HARNESSING THERMAL GRADIENT ENERGY

(71) Applicants: Rahul S. Nana, Panama City, FL (US); Rafael A. Feria, Pickens, SC (US)

(72) Inventors: Rahul S. Nana, Panama City, FL (US); Rafael A. Feria, Pickens, SC (US)

( * ) Notice: Subject to any disclaimer, the term of this patent is extended or adjusted under 35 U.S.C. 154(b) by 0 days.

(21) Appl. No.: 18/979,871

(22) Filed: Dec. 13, 2024

(65) Prior Publication Data

US 2025/0149608 A1 May 8, 2025

Related U.S. Application Data

(63) Continuation-in-part of application No. 18/774,490, filed on Jul. 16, 2024, now Pat. No. 12,341,228, and (Continued)

(51) Int. Cl.
*H01M 8/22* (2006.01)
*B01D 5/00* (2006.01)
(Continued)

(52) U.S. Cl.
CPC ............ *H01M 8/227* (2013.01); *B01D 5/006* (2013.01); *B01D 53/18* (2013.01); *B01D 61/002* (2013.01);
(Continued)

(58) Field of Classification Search
None
See application file for complete search history.

(56) References Cited

U.S. PATENT DOCUMENTS 4,171,409 A 10/1979 Loeb
4,283,913 A 8/1981 Loeb
(Continued)

FOREIGN PATENT DOCUMENTS

AU 2010201962 A1 12/2010
BR MU8702650 U2 4/2009
(Continued)

OTHER PUBLICATIONS

International Search Report and Written Opinion dated Jul. 31, 2023 in counterpart application No. PCT/US2023/021444.
(Continued)

*Primary Examiner* — Krishnan S Menon
(74) *Attorney, Agent, or Firm* — Fox Rothschild LLP; Carol E. Thorstad-Forsyth

(57) ABSTRACT

A method and system of generating electrical power or hydrogen from thermal energy is disclosed. The method includes adding heat to (or removing heat from) a salinity gradient generator configured to generate a more concentrated and a less concentrated saline solution. The method further includes drawing the more concentrated saline solution and the less concentrated saline solution from the salinity gradient generator and feeding the more concentrated saline solution and the less concentrated saline solution into a power generator. Feeding the saline solutions into the power generator causes the power generator to receive the saline solutions and generate power by performing a controlled mixing of the more concentrated saline solution and the less concentrated saline solution. The method further includes drawing, from the power generator, a combined saline solution comprising the mixed saline solutions and feeding the combined saline solution to the salinity gradient generator.

8 Claims, 9 Drawing Sheets

Related U.S. Application Data a continuation-in-part of application No. 18/510,039, filed on Nov. 15, 2023, now Pat. No. 12,374,711, which is a continuation of application No. 18/314,261, filed on May 9, 2023, now Pat. No. 11,855,324, said application No. 18/774,490 is a continuation of application No. 18/314,247, filed on May 9, 2023, now Pat. No. 12,040,517.

(60) Provisional application No. 63/425,514, filed on Nov. 15, 2022, provisional application No. 63/490,405, filed on Mar. 15, 2023.

(51) Int. Cl.

*B01D 53/18* (2006.01)
*B01D 61/00* (2006.01)
*B01D 61/36* (2006.01)
*B01D 61/44* (2006.01)
*B01D 69/02* (2006.01)
*C25B 1/04* (2021.01)
*C25B 9/65* (2021.01)
*H01M 8/04029* (2016.01)
*H01M 8/06* (2016.01)
*H02N 11/00* (2006.01)

(52) U.S. Cl.

CPC ........... *B01D 61/364* (2013.01); *B01D 61/44* (2013.01); *B01D 69/02* (2013.01); *C25B 1/04* (2013.01); *C25B 9/65* (2021.01); *H01M 8/04029* (2013.01); *H01M 8/0693* (2013.01); *H02N 11/002* (2013.01); *B01D 2313/221* (2022.08); *B01D 2313/502* (2022.08); *B01D 2325/38* (2013.01)

(56) References Cited

U.S. PATENT DOCUMENTS 4,390,402 A 6/1983 Mani et al.
4,404,081 A 9/1983 Murphy
5,238,574 A 8/1993 Kawashima et al.
5,421,962 A 6/1995 Shvarts et al.
5,496,659 A 3/1996 Zito
5,618,507 A 4/1997 Olper et al.
5,643,968 A 7/1997 Andreola et al.
6,030,535 A 2/2000 Hayashi et al.
6,042,701 A 3/2000 Lichtwardt et al.
6,187,201 B1 2/2001 Abe et al.
6,436,154 B1 8/2002 Halverson et al.
6,569,298 B2 5/2003 Merida-Donis
6,783,682 B1 8/2004 Awerbuch
7,037,430 B2 5/2006 Donaldson et al.
7,127,894 B2 10/2006 Battah
7,189,325 B2 3/2007 Wobben
7,303,674 B2 12/2007 Lampi et al.
7,550,088 B2 6/2009 Wobben
7,628,921 B2 12/2009 Efraty
7,879,243 B2 2/2011 Al-Mayahi et al.
7,901,577 B2 3/2011 SenGupta et al.
7,914,680 B2 3/2011 Cath et al.
8,029,671 B2 10/2011 Cath et al.
8,062,527 B2 11/2011 Ito et al.
8,083,942 B2 12/2011 Cath et al.
8,099,198 B2 1/2012 Gurin
8,123,948 B2 2/2012 Jensen
8,142,942 B2 3/2012 Imanaka
8,177,978 B2 5/2012 Kurth et al.
8,197,664 B2 6/2012 Murahara
8,216,474 B2 7/2012 Cath et al.
8,323,491 B2 12/2012 Brauns
8,647,509 B2 2/2014 Vora et al.
8,685,249 B2 4/2014 Takeuchi et al.
8,695,343 B2 4/2014 Moe
8,758,954 B2 6/2014 Van Baak et al.
8,834,712 B2 9/2014 Katayama et al.
8,871,074 B2 10/2014 Suh et al.
8,915,378 B2 12/2014 Tokimi et al.
8,932,448 B2 1/2015 Valk et al.
8,956,782 B2 2/2015 Van Berchum et al.
8,956,783 B2 2/2015 Antheunis et al.
8,968,963 B2 3/2015 Van Berchum et al.
8,968,964 B2 3/2015 Antheunis et al.
8,968,965 B2 3/2015 Antheunis et al.
8,980,100 B2 3/2015 Chidambaran
9,067,811 B1 6/2015 Bennett et al.
9,108,169 B2 8/2015 Sano et al.
9,112,217 B2 8/2015 Kim et al.
9,156,714 B2 10/2015 McCluskey et al.
9,216,385 B2 12/2015 Isaias et al.
9,227,168 B1 1/2016 DeVaul et al.
9,242,213 B1 1/2016 Aylesworth
9,278,315 B2 3/2016 Davis et al.
9,297,366 B2 3/2016 Paripati et al.
9,359,998 B2 6/2016 Linnig et al.
9,382,135 B2 7/2016 Moe et al.
9,409,117 B2 8/2016 Ukai et al.
9,433,900 B2 9/2016 Ordonez Fernandez
9,474,998 B2 10/2016 Koo et al.
9,502,720 B2 11/2016 Tsai et al.
9,540,255 B2 1/2017 Kang et al.
9,556,316 B2 1/2017 Antheunis
9,604,178 B1 3/2017 Bharwada et al.
9,611,368 B2 4/2017 Lin
9,675,940 B2 6/2017 Van Berchum et al.
9,688,548 B2 6/2017 Dette et al.
9,751,046 B2 9/2017 Sakai et al.
9,851,129 B1 12/2017 Tanner
9,915,436 B1 3/2018 Feria
9,932,257 B2 4/2018 Prakash et al.
9,938,167 B2 4/2018 Su et al.
9,944,765 B2 4/2018 Antheunis
9,950,297 B2 4/2018 Chang et al.
9,957,169 B2 5/2018 Shinoda et al.
9,982,104 B2 5/2018 Choi et al.
9,988,287 B2 6/2018 Cai
10,029,927 B2 7/2018 Murtha et al.
10,046,280 B2 8/2018 Hayakawa et al.
10,065,868 B2 9/2018 Alshahrani
10,093,747 B2 10/2018 Kurihara et al.
10,118,836 B2 11/2018 Dette et al.
10,144,654 B2 12/2018 Govindan et al.
10,177,396 B2 1/2019 Van Baak
10,189,733 B2 1/2019 Wallace
10,221,491 B2 3/2019 Blunn et al.
10,226,740 B2 3/2019 Wallace
10,308,524 B1 6/2019 Ahmed et al.
10,336,638 B1 7/2019 Bader
10,363,688 B2 7/2019 Moon et al.
10,384,164 B2 8/2019 Iyer
10,384,165 B1 8/2019 Haidar et al.
10,399,878 B2 9/2019 Ukai et al.
10,473,091 B2 11/2019 Halloy et al.
10,562,793 B2 2/2020 Cioanta et al.
10,597,309 B2 3/2020 Alshahrani
10,603,636 B2 3/2020 Bublitz
10,615,441 B2 4/2020 Kaku et al.
10,626,029 B2 4/2020 Lin
10,626,037 B2 4/2020 Lienhard et al.
10,653,976 B2 5/2020 Miki
10,829,913 B1 11/2020 Ahmed et al.
10,830,508 B2 11/2020 Tanner
10,934,181 B2 3/2021 Constantz
10,954,145 B2 3/2021 Ortiz Diaz-Guerra et al.
10,988,391 B2 4/2021 Kim et al.
11,000,806 B2 5/2021 Efraty
11,002,373 B2 5/2021 Fink et al.
11,014,833 B2 5/2021 Weng
11,014,834 B2 5/2021 Janson et al.
11,067,317 B2 7/2021 Feria
11,198,096 B1 12/2021 Efraty
11,198,097 B2 12/2021 Wei et al.
11,220,448 B2 1/2022 Scheu

(56) References Cited

U.S. PATENT DOCUMENTS

| | | | |
|---|---|---|---|
| 11,502,322 | B1 | 11/2022 | Nana |
| 11,502,323 | B1 | 11/2022 | Nana |
| 11,563,229 | B1 | 1/2023 | Nana |
| 11,566,823 | B1 | 1/2023 | Feria |
| 11,611,099 | B1 | 3/2023 | Nana |
| 2004/0013918 | A1 | 1/2004 | Merida-Donis |
| 2004/0219400 | A1 | 11/2004 | Al-Hallaj et al. |
| 2005/0006295 | A1 | 1/2005 | Bharwada |
| 2005/0067352 | A1 | 3/2005 | Kontos |
| 2005/0103631 | A1 | 5/2005 | Freydina et al. |
| 2006/0263646 | A1 | 11/2006 | Seale |
| 2007/0227966 | A1 | 10/2007 | Koo et al. |
| 2009/0272692 | A1 | 11/2009 | Kurth et al. |
| 2010/0163471 | A1 | 7/2010 | Elyanow et al. |
| 2010/0206743 | A1 | 8/2010 | Sharif |
| 2011/0042219 | A1 | 2/2011 | Wei et al. |
| 2011/0050158 | A1 | 3/2011 | MacDonald et al. |
| 2011/0100218 | A1 | 5/2011 | Wolfe |
| 2011/0117395 | A1 | 5/2011 | Roodenburg |
| 2011/0309020 | A1 | 12/2011 | Rietman et al. |
| 2012/0018365 | A1 | 1/2012 | Iyer |
| 2012/0080377 | A1 | 4/2012 | Jensen et al. |
| 2012/0132591 | A1 | 5/2012 | Zhu et al. |
| 2012/0160753 | A1 | 6/2012 | Vora et al. |
| 2013/0001162 | A1 | 1/2013 | Yangali-Quintanilla et al. |
| 2013/0101486 | A1 | 4/2013 | Liu et al. |
| 2013/0118887 | A1 | 5/2013 | Frolov et al. |
| 2013/0288142 | A1 | 10/2013 | Fu et al. |
| 2014/0021135 | A1 | 1/2014 | Sawyer et al. |
| 2014/0042089 | A1 | 2/2014 | Matsui et al. |
| 2014/0246371 | A1 | 9/2014 | Cao et al. |
| 2014/0255813 | A1 | 9/2014 | Kingsbury |
| 2014/0308712 | A1 | 10/2014 | Hanakawa et al. |
| 2015/0165380 | A1 | 6/2015 | Jung et al. |
| 2015/0266762 | A1 | 9/2015 | Jang et al. |
| 2016/0016116 | A1 | 1/2016 | Ge et al. |
| 2016/0023925 | A1 | 1/2016 | Liu |
| 2016/0115061 | A1 | 4/2016 | Ukai et al. |
| 2016/0376680 | A1 | 12/2016 | Abuhasel et al. |
| 2017/0014758 | A1 | 1/2017 | Wilkinson et al. |
| 2017/0098846 | A1 | 4/2017 | Watakabe et al. |
| 2017/0152159 | A1 | 6/2017 | Stauffer |
| 2017/0173532 | A1 | 6/2017 | Ide et al. |
| 2017/0240439 | A1 | 8/2017 | Lin |
| 2017/0326499 | A1 | 11/2017 | Iyer |
| 2017/0334738 | A1 | 11/2017 | Suh |
| 2018/0126336 | A1 | 5/2018 | Iyer |
| 2018/0147532 | A1 | 5/2018 | Switzer et al. |
| 2018/0169541 | A1 | 6/2018 | Anderson |
| 2018/0180034 | A1 | 6/2018 | Wei |
| 2018/0326366 | A1 | 11/2018 | Kim et al. |
| 2019/0003465 | A1* | 1/2019 | Hu .......................... F03B 17/06 |
| 2019/0226463 | A1 | 7/2019 | Feng et al. |
| 2019/0374780 | A1 | 12/2019 | Hestekin et al. |
| 2020/0047130 | A1 | 2/2020 | Ishii |
| 2020/0061541 | A1 | 2/2020 | Herron et al. |
| 2020/0101427 | A1 | 4/2020 | Gao et al. |
| 2020/0267894 | A1 | 8/2020 | Maisonneuve |
| 2020/0292207 | A1 | 9/2020 | Feria |
| 2020/0316354 | A1 | 10/2020 | Jeong et al. |
| 2021/0002148 | A1 | 1/2021 | Sato et al. |
| 2021/0024375 | A1 | 1/2021 | Cen et al. |
| 2021/0054252 | A1 | 2/2021 | Novek |
| 2021/0087697 | A1 | 3/2021 | Riabtsev et al. |
| 2021/0178326 | A1 | 6/2021 | Mottet et al. |
| 2021/0268438 | A1 | 9/2021 | Nishiura |
| 2021/0323851 | A1 | 10/2021 | Jones et al. |
| 2022/0002170 | A1 | 1/2022 | Phatak |
| 2023/0228430 | A1 | 7/2023 | Feria |
| 2025/0149608 | A1 | 5/2025 | Nana et al. |
| 2026/0018642 | A1 | 1/2026 | Nana et al. |

FOREIGN PATENT DOCUMENTS

| | | | |
|---|---|---|---|
| CA | 2604132 | A1 | 5/2009 |
| CN | 1208719 | A | 2/1999 |
| CN | 1375461 | A | 10/2002 |
| CN | 2883340 | Y | 3/2007 |
| CN | 101029733 | A | 9/2007 |
| CN | 101767840 | A | 7/2010 |
| CN | 101891267 | A | 11/2010 |
| CN | 101955277 | A | 1/2011 |
| CN | 101967017 | A | 2/2011 |
| CN | 201746366 | U | 2/2011 |
| CN | 102040258 | A | 5/2011 |
| CN | 102134137 | A | 7/2011 |
| CN | 202054635 | U | 11/2011 |
| CN | 202056062 | U | 11/2011 |
| CN | 202072502 | U | 12/2011 |
| CN | 101358578 | B | 5/2012 |
| CN | 202246147 | U | 5/2012 |
| CN | 102120663 | B | 7/2012 |
| CN | 102747717 | A | 10/2012 |
| CN | 202474102 | U | 10/2012 |
| CN | 202586809 | U | 12/2012 |
| CN | 102211803 | B | 1/2013 |
| CN | 102452751 | B | 1/2013 |
| CN | 102897800 | A | 1/2013 |
| CN | 202729841 | U | 2/2013 |
| CN | 102963966 | A | 3/2013 |
| CN | 202811178 | U | 3/2013 |
| CN | 202811240 | U | 3/2013 |
| CN | 202924780 | U | 5/2013 |
| CN | 103172189 | A | 6/2013 |
| CN | 102627339 | B | 7/2013 |
| CN | 102795686 | B | 7/2013 |
| CN | 103193304 | A | 7/2013 |
| CN | 203112560 | U | 8/2013 |
| CN | 203159267 | U | 8/2013 |
| CN | 102976559 | B | 9/2013 |
| CN | 103362763 | A | 10/2013 |
| CN | 203222497 | U | 10/2013 |
| CN | 203229396 | U | 10/2013 |
| CN | 203360202 | U | 12/2013 |
| CN | 103570088 | A | 2/2014 |
| CN | 103274488 | B | 4/2014 |
| CN | 203530063 | U | 4/2014 |
| CN | 102840091 | B | 5/2014 |
| CN | 102840092 | B | 5/2014 |
| CN | 102840093 | B | 5/2014 |
| CN | 102852702 | B | 5/2014 |
| CN | 102852703 | B | 5/2014 |
| CN | 102852704 | B | 5/2014 |
| CN | 203625184 | U | 6/2014 |
| CN | 102610844 | B | 7/2014 |
| CN | 103101932 | B | 7/2014 |
| CN | 103359896 | B | 7/2014 |
| CN | 102464343 | B | 8/2014 |
| CN | 102812884 | B | 8/2014 |
| CN | 103288285 | B | 8/2014 |
| CN | 203781962 | U | 8/2014 |
| CN | 104098157 | A | 10/2014 |
| CN | 104140135 | A | 11/2014 |
| CN | 204058158 | U | 12/2014 |
| CN | 102757138 | B | 1/2015 |
| CN | 104370394 | A | 2/2015 |
| CN | 103818978 | B | 4/2015 |
| CN | 104534731 | A | 4/2015 |
| CN | 204301361 | U | 4/2015 |
| CN | 104601042 | A | 5/2015 |
| CN | 204334382 | U | 5/2015 |
| CN | 204434315 | U | 7/2015 |
| CN | 103708665 | B | 10/2015 |
| CN | 204689747 | U | 10/2015 |
| CN | 105048870 | A | 11/2015 |
| CN | 204752255 | U | 11/2015 |
| CN | 105110543 | A | 12/2015 |
| CN | 204848326 | U | 12/2015 |
| CN | 204897499 | U | 12/2015 |
| CN | 104071875 | B | 1/2016 |
| CN | 105254101 | A | 1/2016 |

(56) References Cited

FOREIGN PATENT DOCUMENTS

CN 105428089 A 3/2016
CN 205088043 U 3/2016
CN 104591461 B 4/2016
CN 105502756 A 4/2016
CN 205133216 U 4/2016
CN 205170431 U 4/2016
CN 103964527 B 5/2016
CN 104649478 B 5/2016
CN 105540930 A 5/2016
CN 105540953 A 5/2016
CN 105540970 A 5/2016
CN 103615363 B 6/2016
CN 205313150 U 6/2016
CN 205328675 U 6/2016
CN 105810985 A 7/2016
CN 205442690 U 8/2016
CN 205472805 U 8/2016
CN 105948337 A 9/2016
CN 205590347 U 9/2016
CN 205590348 U 9/2016
CN 205603350 U 9/2016
CN 104355473 B 10/2016
CN 106058921 A 10/2016
CN 106145229 A 11/2016
CN 205740453 U 11/2016
CN 205740598 U 11/2016
CN 106207234 A 12/2016
CN 106219648 A 12/2016
CN 106242145 A 12/2016
CN 106277120 A 1/2017
CN 106277121 A 1/2017
CN 106277122 A 1/2017
CN 106277123 A 1/2017
CN 106277124 A 1/2017
CN 106277125 A 1/2017
CN 106277133 A 1/2017
CN 106277134 A 1/2017
CN 106277135 A 1/2017
CN 106277136 A 1/2017
CN 106277137 A 1/2017
CN 106348510 A 1/2017
CN 106365233 A 2/2017
CN 106365234 A 2/2017
CN 106379961 A 2/2017
CN 106395926 A 2/2017
CN 106400879 A 2/2017
CN 106430786 A 2/2017
CN 205974125 U 2/2017
CN 105060380 B 3/2017
CN 106477800 A 3/2017
CN 104944487 B 4/2017
CN 106554103 A 4/2017
CN 206098553 U 4/2017
CN 104986818 B 5/2017
CN 106630359 A 5/2017
CN 106242133 B 6/2017
CN 106830479 A 6/2017
CN 206244450 U 6/2017
CN 206279019 U 6/2017
CN 104153946 B 7/2017
CN 105261808 B 7/2017
CN 106981674 A 7/2017
CN 206308197 U 7/2017
CN 107008155 A 8/2017
CN 107165791 A 9/2017
CN 107188358 A 9/2017
CN 206529357 U 9/2017
CN 105439351 B 10/2017
CN 105439352 B 10/2017
CN 105439353 B 10/2017
CN 105439354 B 10/2017
CN 105540968 B 10/2017
CN 206592241 U 10/2017
CN 107311353 A 11/2017
CN 107326387 A 11/2017
CN 107522307 A 12/2017
CN 104944492 B 1/2018
CN 206878725 U 1/2018
CN 105502784 B 3/2018
CN 207064144 U 3/2018
CN 105753104 B 4/2018
CN 107922213 A 4/2018
CN 107973481 A 5/2018
CN 107987844 A 5/2018
CN 108083518 A 5/2018
CN 108097059 A 6/2018
CN 108114599 A 6/2018
CN 207478339 U 6/2018
CN 108380050 A 8/2018
CN 108423733 A 8/2018
CN 108439675 A 8/2018
CN 108910996 A 11/2018
CN 108996616 A 12/2018
CN 109020021 A 12/2018
CN 208279441 U 12/2018
CN 208327445 U 1/2019
CN 208394968 U 1/2019
CN 105800886 B 2/2019
CN 109304088 A 2/2019
CN 109311709 A 2/2019
CN 109534568 A 3/2019
CN 109534585 A 3/2019
CN 208639229 U 3/2019
CN 109593973 A 4/2019
CN 109599572 A 4/2019
CN 109607918 A 4/2019
CN 106492639 B 5/2019
CN 109810254 A 5/2019
CN 208916850 U 5/2019
CN 103269777 B 6/2019
CN 106995253 B 6/2019
CN 109867317 A 6/2019
CN 109889099 A 6/2019
CN 109928561 A 6/2019
CN 106587446 B 7/2019
CN 109956604 A 7/2019
CN 109957885 A 7/2019
CN 110104851 A 8/2019
CN 110182915 A 8/2019
CN 209259726 U 8/2019
CN 110204009 A 9/2019
CN 209411984 U 9/2019
CN 110358143 A 10/2019
CN 107158968 B 11/2019
CN 110407276 A 11/2019
CN 110498523 A 11/2019
CN 209567937 U 11/2019
CN 209685356 U 11/2019
CN 110560179 A 12/2019
CN 110601600 A 12/2019
CN 209721842 U 12/2019
CN 110683693 A 1/2020
CN 110734178 A 1/2020
CN 110776185 A 2/2020
CN 210122508 U 3/2020
CN 107158967 B 4/2020
CN 109617455 B 4/2020
CN 111036098 A 4/2020
CN 111056676 A 4/2020
CN 210313850 U 4/2020
CN 111170517 A 5/2020
CN 210620293 U 5/2020
CN 108123152 B 6/2020
CN 111268754 A 6/2020
CN 111282443 A 6/2020
CN 111342703 A 6/2020
CN 106877742 B 7/2020
CN 107265734 B 7/2020
CN 110510712 B 7/2020
CN 111470704 A 7/2020
CN 211056755 U 7/2020
CN 111517533 A 8/2020
CN 111564884 A 8/2020
CN 111573787 A 8/2020

(56) References Cited

FOREIGN PATENT DOCUMENTS

| | | | |
|---|---|---|---|
| CN | 211310967 | U | 8/2020 |
| CN | 107362694 | B | 9/2020 |
| CN | 109179832 | B | 9/2020 |
| CN | 109811358 | B | 9/2020 |
| CN | 211497236 | U | 9/2020 |
| CN | 211595081 | U | 9/2020 |
| CN | 106915789 | B | 10/2020 |
| CN | 106927541 | B | 10/2020 |
| CN | 111744364 | A | 10/2020 |
| CN | 111763103 | A | 10/2020 |
| CN | 111792743 | A | 10/2020 |
| CN | 211644724 | U | 10/2020 |
| CN | 111871219 | A | 11/2020 |
| CN | 111943398 | A | 11/2020 |
| CN | 111995011 | A | 11/2020 |
| CN | 111807473 | B | 12/2020 |
| CN | 107954528 | B | 1/2021 |
| CN | 112266050 | A | 1/2021 |
| CN | 212403781 | U | 1/2021 |
| CN | 108083369 | B | 2/2021 |
| CN | 109802163 | B | 2/2021 |
| CN | 112299515 | A | 2/2021 |
| CN | 212504155 | U | 2/2021 |
| CN | 212504424 | U | 2/2021 |
| CN | 212581574 | U | 2/2021 |
| CN | 110316913 | B | 3/2021 |
| CN | 112436758 | A | 3/2021 |
| CN | 112456608 | A | 3/2021 |
| CN | 112479314 | A | 3/2021 |
| CN | 112479467 | A | 3/2021 |
| CN | 112520915 | A | 3/2021 |
| CN | 112551624 | A | 3/2021 |
| CN | 112569805 | A | 3/2021 |
| CN | 108976258 | B | 4/2021 |
| CN | 112607806 | A | 4/2021 |
| CN | 112610433 | A | 4/2021 |
| CN | 112661223 | A | 4/2021 |
| CN | 112694180 | A | 4/2021 |
| CN | 112707566 | A | 4/2021 |
| CN | 109336206 | B | 5/2021 |
| CN | 108716447 | B | 6/2021 |
| CN | 111628675 | B | 6/2021 |
| CN | 112194136 | B | 6/2021 |
| CN | 112713808 | B | 6/2021 |
| CN | 112892230 | A | 6/2021 |
| CN | 112910314 | A | 6/2021 |
| CN | 112939321 | A | 6/2021 |
| CN | 213416391 | U | 6/2021 |
| CN | 108025930 | B | 7/2021 |
| CN | 113134305 | A | 7/2021 |
| CN | 113137338 | A | 7/2021 |
| CN | 113153676 | A | 7/2021 |
| CN | 213656765 | U | 7/2021 |
| CN | 109250846 | B | 8/2021 |
| CN | 110746657 | B | 8/2021 |
| CN | 112973463 | B | 8/2021 |
| CN | 113233623 | A | 8/2021 |
| CN | 113278152 | A | 8/2021 |
| CN | 113292144 | A | 8/2021 |
| CN | 113321257 | A | 8/2021 |
| CN | 113415838 | A | 9/2021 |
| CN | 113244779 | B | 10/2021 |
| CN | 113461887 | A | 10/2021 |
| CN | 214400132 | U | 10/2021 |
| CN | 112678930 | B | 11/2021 |
| CN | 214571328 | U | 11/2021 |
| CN | 214654101 | U | 11/2021 |
| CN | 214654190 | U | 11/2021 |
| CN | 109534465 | B | 12/2021 |
| CN | 109867313 | B | 12/2021 |
| CN | 110523296 | B | 12/2021 |
| CN | 215539863 | U | 1/2022 |
| DE | 114941 | A1 | 9/1975 |
| DE | 2510168 | A1 | 9/1976 |
| DE | 2829530 | A1 | 1/1980 |
| DE | 2847519 | A1 | 5/1980 |
| DE | 2851105 | A1 | 5/1980 |
| DE | 3714628 | A1 | 11/1987 |
| DE | 19620214 | A1 | 10/1996 |
| DE | 19603494 | C2 | 2/1998 |
| DE | 19649146 | A1 | 5/1998 |
| DE | 19714512 | C2 | 6/1999 |
| DE | 10222316 | B4 | 5/2004 |
| DE | 202007013079 | U1 | 12/2007 |
| DE | 102009051845 | A1 | 9/2011 |
| DE | 102014225190 | A1 | 6/2016 |
| DK | 166657 | B | 6/1993 |
| EA | 31763 | B1 | 2/2019 |
| EP | 979801 | A1 | 2/2000 |
| EP | 1426097 | A1 | 6/2004 |
| EP | 1833595 | A1 | 9/2007 |
| EP | 1935479 | B1 | 9/2009 |
| EP | 2125173 | A1 | 12/2009 |
| EP | 2089142 | B1 | 7/2010 |
| EP | 2374760 | A1 | 10/2011 |
| EP | 1540019 | B1 | 4/2012 |
| EP | 2516561 | A1 | 10/2012 |
| EP | 2546201 | A1 | 1/2013 |
| EP | 2122736 | B1 | 11/2013 |
| EP | 2697512 | A1 | 2/2014 |
| EP | 2507515 | B1 | 7/2016 |
| EP | 2804682 | B1 | 11/2016 |
| EP | 2367613 | B1 | 3/2018 |
| EP | 3201140 | B1 | 7/2018 |
| EP | 2996989 | B1 | 10/2018 |
| EP | 3643683 | A2 | 4/2020 |
| EP | 3680847 | A1 | 7/2020 |
| EP | 3708544 | A1 | 9/2020 |
| EP | 2857441 | B1 | 10/2020 |
| EP | 3656461 | A4 | 3/2021 |
| EP | 3912707 | A1 | 11/2021 |
| EP | 3939692 | A1 | 1/2022 |
| ES | 2299396 | B1 | 4/2009 |
| ES | 1229209 | U | 5/2019 |
| ES | 1229209 | Y | 7/2019 |
| ES | 1248815 | Y | 9/2020 |
| ES | 2814028 | A1 | 3/2021 |
| FR | 2583738 | A1 | 12/1986 |
| FR | 2848877 | B1 | 4/2012 |
| GB | 2194669 | A | 3/1988 |
| GB | 2194855 | A | 3/1988 |
| GB | 2197116 | A | 5/1988 |
| GB | 2202550 | A | 9/1988 |
| GB | 2195818 | B | 8/1990 |
| GB | 2442941 | A | 4/2008 |
| IL | 72916 | A | 9/1987 |
| IL | 147905 | | 7/2005 |
| IL | 225697 | | 8/2017 |
| IN | 201500935 11 | | 10/2016 |
| IN | 201741039747 | A | 12/2017 |
| IN | 202011038480 | A | 10/2020 |
| JP | 60168504 | A | 9/1985 |
| JP | 63100996 | A | 6/1988 |
| JP | 2002306118 | A | 10/2002 |
| JP | 2003031255 | A | 1/2003 |
| JP | 2003120427 | A | 4/2003 |
| JP | 2003305343 | A | 10/2003 |
| JP | 2003340439 | A | 12/2003 |
| JP | 2004012303 | A | 1/2004 |
| JP | 2005049173 | A | 2/2005 |
| JP | 03637458 | B2 | 4/2005 |
| JP | 2005268114 | A | 9/2005 |
| JP | 2006004797 | A | 1/2006 |
| JP | 2006004832 | A | 1/2006 |
| JP | 03773437 | B2 | 5/2006 |
| JP | 03906677 | B2 | 4/2007 |
| JP | 4092374 | B2 | 5/2008 |
| JP | 2008103262 | A | 5/2008 |
| JP | 2008269807 | A | 11/2008 |
| JP | 2009112925 | A | 5/2009 |
| JP | 2010077934 | A | 4/2010 |
| JP | 2010517746 | A | 5/2010 |
| JP | 04629999 | B2 | 2/2011 |
| JP | 2011025119 | A | 2/2011 |

(56) References Cited

FOREIGN PATENT DOCUMENTS

| | | | |
|---|---|---|---|
| JP | 04843908 | B2 | 12/2011 |
| JP | 05131952 | B2 | 1/2013 |
| JP | 2013181501 | A | 9/2013 |
| JP | 2014069181 | A | 4/2014 |
| JP | 05713348 | B2 | 5/2015 |
| JP | 2015166478 | A | 9/2015 |
| JP | 2015202445 | A | 11/2015 |
| JP | 2016000995 | A | 1/2016 |
| JP | 05862372 | B2 | 2/2016 |
| JP | 2016051519 | A | 4/2016 |
| JP | 05940387 | B2 | 6/2016 |
| JP | 05970664 | B2 | 8/2016 |
| JP | 05980521 | B2 | 8/2016 |
| JP | 06021739 | B2 | 11/2016 |
| JP | 2017025834 | A | 2/2017 |
| JP | 2017091857 | A | 5/2017 |
| JP | 2017152199 | A | 8/2017 |
| JP | 06311089 | B2 | 4/2018 |
| JP | 06431658 | B2 | 11/2018 |
| JP | 2019072660 | A | 5/2019 |
| JP | 2019098205 | A | 6/2019 |
| JP | 2020027761 | A | 2/2020 |
| JP | 2021502239 | A | 1/2021 |
| JP | 2021100744 | A | 7/2021 |
| JP | 06956953 | B2 | 11/2021 |
| KR | 100893565 | B1 | 4/2009 |
| KR | 100956652 | B1 | 5/2010 |
| KR | 101011403 | B1 | 1/2011 |
| KR | 20110138464 | A | 12/2011 |
| KR | 101109534 | B1 | 1/2012 |
| KR | 101131092 | B1 | 3/2012 |
| KR | 101184650 | B1 | 9/2012 |
| KR | 101184652 | B1 | 9/2012 |
| KR | 101190610 | B1 | 10/2012 |
| KR | 101200838 | B1 | 11/2012 |
| KR | 101206618 | B1 | 11/2012 |
| KR | 1239440 | B1 | 3/2013 |
| KR | 101245264 | B1 | 3/2013 |
| KR | 101297857 | B1 | 8/2013 |
| KR | 101311360 | B1 | 10/2013 |
| KR | 101328279 | B1 | 11/2013 |
| KR | 101328433 | B1 | 11/2013 |
| KR | 101328524 | B1 | 11/2013 |
| KR | 2013123888 | A | 11/2013 |
| KR | 101338187 | B1 | 12/2013 |
| KR | 20130143219 | A | 12/2013 |
| KR | 101387136 | B1 | 4/2014 |
| KR | 101394132 | B1 | 5/2014 |
| KR | 101394237 | B1 | 5/2014 |
| KR | 20140003731 | A | 6/2014 |
| KR | 101431636 | B1 | 8/2014 |
| KR | 101454314 | B1 | 10/2014 |
| KR | 20140116724 | A | 10/2014 |
| KR | 20150046410 | A | 4/2015 |
| KR | 1519828 | B1 | 5/2015 |
| KR | 1526214 | B1 | 6/2015 |
| KR | 101544747 | B1 | 8/2015 |
| KR | 101555781 | B1 | 9/2015 |
| KR | 2015100091 | A | 9/2015 |
| KR | 101557704 | B1 | 10/2015 |
| KR | 20150145997 | A | 12/2015 |
| KR | 101587592 | B1 | 1/2016 |
| KR | 101596301 | B1 | 2/2016 |
| KR | 101609795 | B1 | 4/2016 |
| KR | 20160054230 | A | 5/2016 |
| KR | 20160059438 | A | 5/2016 |
| KR | 101632685 | B1 | 6/2016 |
| KR | 101641789 | B1 | 7/2016 |
| KR | 101643146 | B1 | 8/2016 |
| KR | 101647994 | B1 | 8/2016 |
| KR | 1668244 | B1 | 10/2016 |
| KR | 20160116824 | A | 10/2016 |
| KR | 20160127402 | A | 11/2016 |
| KR | 101683602 | B1 | 12/2016 |
| KR | 101695881 | B1 | 1/2017 |
| KR | 1705783 | B1 | 2/2017 |
| KR | 101702850 | B1 | 2/2017 |
| KR | 101710006 | B1 | 2/2017 |
| KR | 101712408 | B1 | 3/2017 |
| KR | 20170023237 | A | 3/2017 |
| KR | 20170023238 | A | 3/2017 |
| KR | 101723807 | B1 | 4/2017 |
| KR | 101726393 | B1 | 4/2017 |
| KR | 101730643 | B1 | 4/2017 |
| KR | 1751291 | B1 | 6/2017 |
| KR | 1758979 | B1 | 7/2017 |
| KR | 101766780 | B1 | 8/2017 |
| KR | 101778562 | B1 | 9/2017 |
| KR | 101789093 | B1 | 10/2017 |
| KR | 101815298 | B1 | 1/2018 |
| KR | 101822188 | B1 | 3/2018 |
| KR | 20180034106 | A | 4/2018 |
| KR | 101844275 | B1 | 5/2018 |
| KR | 101857444 | B1 | 5/2018 |
| KR | 20180081279 | A | 7/2018 |
| KR | 101892075 | B1 | 8/2018 |
| KR | 101906544 | B1 | 10/2018 |
| KR | 101909397 | B1 | 10/2018 |
| KR | 2018111229 | A | 10/2018 |
| KR | 101918275 | B1 | 11/2018 |
| KR | 101946980 | B1 | 2/2019 |
| KR | 101933000 | B1 | 3/2019 |
| KR | 101966941 | B1 | 4/2019 |
| KR | 20190041104 | A | 4/2019 |
| KR | 20190058117 | A | 5/2019 |
| KR | 101956293 | B1 | 6/2019 |
| KR | 101958734 | B1 | 7/2019 |
| KR | 102016320 | B1 | 8/2019 |
| KR | 2016503 | B1 | 9/2019 |
| KR | 102020657 | B1 | 9/2019 |
| KR | 2015064 | B1 | 10/2019 |
| KR | 102006120 | B1 | 10/2019 |
| KR | 102018617 | B1 | 11/2019 |
| KR | 102030113 | B1 | 11/2019 |
| KR | 102042043 | B1 | 11/2019 |
| KR | 102055255 | B1 | 1/2020 |
| KR | 102063831 | B1 | 1/2020 |
| KR | 102065275 | B1 | 1/2020 |
| KR | 102072469 | B1 | 2/2020 |
| KR | 20200024695 | A | 3/2020 |
| KR | 20200036416 | A | 4/2020 |
| KR | 20200073886 | A | 6/2020 |
| KR | 102143397 | B1 | 8/2020 |
| KR | 102144454 | B1 | 8/2020 |
| KR | 102175288 | B1 | 11/2020 |
| KR | 102183195 | B1 | 11/2020 |
| KR | 20200139009 | A | 12/2020 |
| KR | 2021067116 | A | 6/2021 |
| KR | 102274447 | B1 | 7/2021 |
| KR | 20210102076 | A | 8/2021 |
| KR | 20210102077 | A | 8/2021 |
| KR | 102297153 | B1 | 9/2021 |
| KR | 20210112483 | A | 9/2021 |
| KR | 102315033 | B1 | 10/2021 |
| KR | 2325186 | B1 | 11/2021 |
| KR | 102344835 | B1 | 12/2021 |
| KZ | 27309 | A4 | 9/2013 |
| KZ | 27310 | A4 | 9/2013 |
| MX | 2016001468 | A | 7/2016 |
| SG | 10201804036 | A1 | 12/2019 |
| SU | 1550292 | A1 | 3/1990 |
| TW | 1363838 | B | 5/2012 |
| TW | 201334847 | A | 9/2013 |
| TW | M476844 | U | 4/2014 |
| TW | 201909514 | A | 3/2019 |
| TW | 1717277 | B | 1/2021 |
| WO | 1994027913 | A1 | 12/1994 |
| WO | 1997016464 | A1 | 5/1997 |
| WO | 2001092555 | A1 | 12/2001 |
| WO | 2006067240 | A1 | 6/2006 |
| WO | 2006072122 | A2 | 7/2006 |
| WO | 2006123258 | A2 | 11/2006 |
| WO | 2007132477 | A1 | 11/2007 |
| WO | 2008053700 | A1 | 5/2008 |

(56) References Cited

FOREIGN PATENT DOCUMENTS

| | | | |
|---|---|---|---|
| WO | 2009015511 | A1 | 2/2009 |
| WO | 2010004819 | A1 | 1/2010 |
| WO | 2010008275 | A1 | 1/2010 |
| WO | 2010018249 | A1 | 2/2010 |
| WO | 2010021158 | A1 | 2/2010 |
| WO | 2010108872 | A1 | 9/2010 |
| WO | 2010143950 | A1 | 12/2010 |
| WO | 2011003874 | A1 | 1/2011 |
| WO | 2011050473 | A1 | 5/2011 |
| WO | 2011148422 | A1 | 12/2011 |
| WO | 2012000558 | A1 | 1/2012 |
| WO | 2012025656 | A1 | 3/2012 |
| WO | 2012032557 | A1 | 3/2012 |
| WO | 2012071994 | A1 | 6/2012 |
| WO | 2012099074 | A1 | 7/2012 |
| WO | 2012102677 | A1 | 8/2012 |
| WO | 2012115114 | A1 | 8/2012 |
| WO | 2012161663 | A1 | 11/2012 |
| WO | 2013036111 | A1 | 3/2013 |
| WO | 2013134710 | A1 | 9/2013 |
| WO | 2013154367 | A1 | 10/2013 |
| WO | 2013169023 | A1 | 11/2013 |
| WO | 2013172605 | A1 | 11/2013 |
| WO | 2014058469 | A1 | 4/2014 |
| WO | 2014091199 | A1 | 6/2014 |
| WO | 2014181898 | A1 | 11/2014 |
| WO | 2016056778 | A1 | 4/2016 |
| WO | 2017190505 | A1 | 11/2017 |
| WO | 2018229505 | A1 | 12/2018 |
| WO | 2019164462 | A1 | 8/2019 |
| WO | 2020017694 | A1 | 1/2020 |
| WO | 2020032356 | A1 | 2/2020 |
| WO | 2020068930 | A1 | 4/2020 |
| WO | 2020072080 | A1 | 4/2020 |
| WO | 2020186665 | A1 | 9/2020 |
| WO | 2020237155 | A1 | 11/2020 |
| WO | 2020251218 | A1 | 12/2020 |
| WO | 2020251568 | A1 | 12/2020 |
| WO | 2020259733 | A1 | 12/2020 |
| WO | 2021047417 | A1 | 3/2021 |
| WO | 2021057558 | A1 | 4/2021 |
| WO | 2021071425 | A1 | 4/2021 |
| WO | 2021071824 | A1 | 4/2021 |
| WO | 2021085979 | A1 | 5/2021 |
| WO | 2021090919 | A1 | 5/2021 |
| WO | 2021165338 | A1 | 8/2021 |
| WO | 2021177823 | A1 | 9/2021 |

OTHER PUBLICATIONS

International Preliminary Report on Patentability issued Nov. 7, 2024 in counterpart PCT application Ser. No. PCT/US2023/021447.

Norwegian University of Science and Technology, https://scitechdaily.com/turning-waste-heat-into-hydrogen-fuel-using-reverse-electrodialysis/, Nov. 23, 2019.

Nuclear Power 2022, https://www.nuclear-power.com/nuclear-engineering/thermodynamics/thermodynamic-cycles/heating-and-air-conditioning/coefficient-of-performance-heat-pump/.

Energy Transition Model, https://docs.energytransitionmodel.com/main/heat-pumps/.

Isidoro Martinez, Heat of Solution Data for Aqueous Solutions, 1995-2022, https://docs.energytransitionmodel.com/ main/heat-pumps/.

Saltworks, https://docs.energytransitionmodel.com/main/heat-pumps/.

Krakhella, K. et al. Heat to H2: Using Waste Heat for Hydrogen Production through Reverse Electrodialysis, Energies 2019, 12(18): 3428.

ResearchGate, https://www.researchgate.net/figure/Illustration-of-reverse-electrodialysis-RED-power-generation-system-Internal_fig7_337494612.

Vermaas, D. et al., Influence of multivalent ions on renewable energy generation in reverse electrodialysis, Energy & Environmental Science, Issue No. 4, 2014, https://pubs.rsc.org/en/content/articlelanding/2014/ee/c3ee43501f <https://urldefense.com/v3/_https:/pubs.rsc.org/en/content/articlelanding/2014/ee/c3ee43501f_;!!A14RNwflftzD!Fc3vkktGCsrDwurEjKK31PqBgHJjiB5xAGk03Da88M00RBPbGIBnjRJqXvO3jmTjVg$>.

Materials Today, Graphene Could Make Tunable Ion Filter, Nov. 27, 2018, https://www.materialstoday.com/computation-theory/news/graphene-could-make-tunable-ion-filter/.

Facchinetti, I. et al., Thermally Regenerable Redox Flow Battery for Exploiting Low-Temperature Heat Sources, Cell Reports Physical Science 1(5): 100056, May 20, 2020.

Palakkal, V et al., High Power Thermally Regenerative Ammonia-Copper Redox Flow Battery Enabled by a Zero Gap Cell Design, Low-Resistant Membranes, and Electrode Coatings, ACS Appl. Energy Matter, 3(5): 4787-98, 2020.

Moreno, J. et al., Upscaling Reverse Electrodialysis, Environ. Sci. Technol. 52: 10856-63, 2018.

Veerman, J. et al., Reverse electrodialysis: evaluation of suitable electrode systems, Journal of Applied Electrochemistry, 40: 1461-74, 2010.

Solbert, Simon B. B., et al. , "Heat to Hydrogen by Reverse Electrodialysis—Using a Non-Equilibrium Thermodynamics Model to Evaluate Hydrogen Production Concepts Utilising Waste Heat", Energies 2022, 15, 6011, published Aug. 19, 2022.

International Search Report and Written Opinion dated Oct. 20, 2023 in counterpart application No. PCT/US2023/021447.

International Search Report and Written Opinion dated Feb. 19, 2024 in counterpart application No. PCT/US2023/079865.

International Search Report and Written Opinion issued in counterpart patent application Ser. No. PCT/US2023/079862 dated Feb. 19, 2024.

International Search Report and Written Opinion for International PCT Patent Application No. PCT/US25/59459, mailed Apr. 29, 2026 (22 pages).

* cited by examiner

SYSTEMS AND METHODS FOR HARNESSING THERMAL GRADIENT ENERGY

CROSS REFERENCE TO RELATED APPLICATIONS

This application is a continuation-in-part of U.S. application Ser. No. 18/510,039, filed Nov. 15, 2023, which is a continuation of U.S. Nonprovisional application Ser. No. 18/314,261, filed May 9, 2023 (now U.S. Pat. No. 11,855, 324, issued Dec. 26, 2023), which claimed priority to U.S. Provisional Application No. 63/425,514, filed on Nov. 15, 2022, and U.S. Provisional Application No. 63/490,405, filed on Mar. 15, 2023. This application is also a continuation-in-part of U.S. application Ser. No. 18/774,490, filed Jul. 16, 2024, which is a continuation of U.S. Nonprovisional application Ser. No. 18/314,247, filed May 9, 2023 (now U.S. Pat. No. 12,040,517, issued Jul. 16, 2024), which claimed priority to U.S. Provisional Application No. 63/425, 514, filed on Nov. 15, 2022, and U.S. Provisional Application No. 63/490,405, filed on Mar. 15, 2023. The entire contents of each of the foregoing applications is hereby incorporated by reference.

FIELD

The present technology is generally related to systems and methods for generating electrical power and/or hydrogen from thermal gradients.

BACKGROUND

Pressure retarded osmosis (PRO), reverse electrodialysis (RED), and osmotic capacitor processes produce electricity from the mixing of solutions with different salt concentrations. RED can be used to retrieve energy from the salinity gradient, e.g., by passing a salt solution and a less concentrated salt solution through a stack of alternating cation and anion exchange membranes. The chemical potential difference between the concentrate and dilute solutions generates a voltage over each membrane and the total potential of the system is the sum of the potential differences over all membranes. PRO relies on solvent transport from a solution of lower osmotic pressure to a solution of higher osmotic pressure. The higher osmotic pressure stream is typically pressurized, and solvent transported to it produces a flow that can be used to turn a turbine. Membranes that selectively allow solvent transport relative to salt transport are an essential component of the PRO process. These systems all rely on differences in the salt concentration between two fluids, commonly fresh and salt water that naturally occurs, e.g., when a river flows into the sea. Locations where salinity gradients do not naturally occur are unable to take full advantage of salinity-gradient energy. Therefore, there is a need for energy-efficient ways to create salinity gradients, particularly at or close to a PRO, RED, or other process for converting the salinity gradient into usable power.

This document describes methods and systems that are directed to addressing the problems described above, and/or other issues.

SUMMARY

The present disclosure describes embodiments related to generating electrical power or hydrogen from thermal energy. A system includes a salinity gradient generator configured to receive heat from a heat source and use the received heat to generate a salinity gradient including a more concentrated saline solution and a less concentrated saline solution. The system also includes a power generator configured to receive the more concentrated saline solution and the less concentrated saline solution and generate power by performing a controlled mixing of the more concentrated saline solution with the less concentrated saline solution. The system is further configured to feed the more concentrated saline solution and the less concentrated saline solution to the power generator, causing the power generator to generate the power.

Implementations of the disclosure may include one or more of the following optional features. In some examples, the salinity gradient generator includes a thermal diffusion unit having a reservoir of a saline solution, the thermal diffusion unit configured to apply the received heat to the reservoir, generating a thermal gradient across the reservoir, resulting in a cooler region of the reservoir and a warmer region of the reservoir. The system may be configured to feed the more concentrated saline solution and the less concentrated saline solution to the power generator by drawing the more concentrated saline solution from the cooler region of the reservoir and drawing the less concentrated saline solution from the warmer region of the reservoir. The thermal diffusion unit may be configured to receive a source of heat and apply the source of heat to the reservoir to generate the thermal gradient. In some examples, the system includes a heat pump configured to add heat to the salinity gradient generator and/or remove heat from the salinity gradient generator. The power generator may include a reverse electrodialysis unit. In some examples, the reverse electrodialysis unit is further configured to, when performing the controlled mixing of the more concentrated saline solution and the less concentrated saline solution, produce a combined saline solution (from the more concentrated saline solution and the less concentrated saline solution). The system may be further configured to draw the combined saline solution from the reverse electrodialysis unit and feed the combined saline solution to the salinity gradient generator. In some examples, the system further includes a membrane distillation unit, and the membrane distillation unit is configured to enhance a salinity difference between the more concentrated saline solution and the less concentrated saline solution before the system feeds the more concentrated saline solution and the less concentrated saline solution to the power generator. The salinity gradient generator may include a salt precipitation system, a salt decomposition system, an evaporation system, or a temperature swing solvent extraction (TSEE) system. The power generator may be configured to produce hydrogen gas. The power generator may include a pressure-retarded osmosis (PRO) system and/or a capacitive mixing (CAP) system. In some examples, the system further includes one or more heat pumps configured to enhance heat transfer to or from the salinity gradient generator. The system may further include a Membrane Distillation (MD) system configured to enhance the salinity gradient generated by the salinity gradient generator.

In some examples, the system is configured to feed the more concentrated saline solution and the less concentrated saline solution to the power generator using at least one pump. In some examples, the system further includes a hydronic branch valve box, and the salinity gradient generator may be configured to receive heat from the heat source using the hydronic branch valve box. The hydronic branch valve box may be further configured to remove heat from the salinity gradient generator.

A method includes adding heat to (or removing heat from) a salinity gradient generator configured to generate a more-concentrated and a less-concentrated saline solution. The method further includes drawing the more concentrated saline solution and the less concentrated saline solution from the salinity gradient generator and feeding the more concentrated saline solution and the less concentrated saline solution into a power generator. Feeding the saline solutions into the power generator causes the power generator to receive the saline solutions and generate power by performing a controlled mixing of the more concentrated saline solution and the less concentrated saline solution. The method further includes drawing, from the power generator, a combined saline solution, including the mixed more-concentrated and less-concentrated saline solutions, and feeding the combined saline solution to the salinity gradient generator.

Implementations of the disclosure may include one or more of the following optional features. In some examples, adding the heat to, or removing the heat from, the salinity gradient generator includes adding the heat to, or removing the heat from, a thermal diffusion unit having a reservoir of a saline solution, causing the thermal diffusion unit to generate a thermal gradient across the reservoir, resulting in a cooler region of the reservoir and a warmer region of the reservoir. Drawing the more concentrated saline solution from the salinity gradient generator may include drawing the more concentrated saline solution from the cooler region of the reservoir and drawing the less concentrated saline solution from the salinity gradient generator may include drawing the less concentrated saline solution from the warmer region of the reservoir. In some examples, the method further includes adding, as needed, makeup water to the reservoir. Feeding the more concentrated saline solution and the less concentrated saline solution into the power generator may include feeding the more concentrated saline solution and the less concentrated saline solution into a reverse electrodialysis unit. The method may further include applying a pressure-retarded osmosis (PRO) system, a capacitive mixing (CAP) system, or both the PRO and CAP systems to generate additional electrical power. Adding the heat to the salinity gradient generator may include adding geothermal heat to the salinity gradient generator. Causing the power generator to generate power may include causing the power generator to generate electricity. The method may further include using a portion of the generated electricity to produce hydrogen gas through electrolysis.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The accompanying drawings, which are incorporated herein and constitute part of this specification, are illustrative of particular embodiments of the present disclosure and do not limit the scope of the present disclosure.

DETAILED DESCRIPTION

Figure 1:
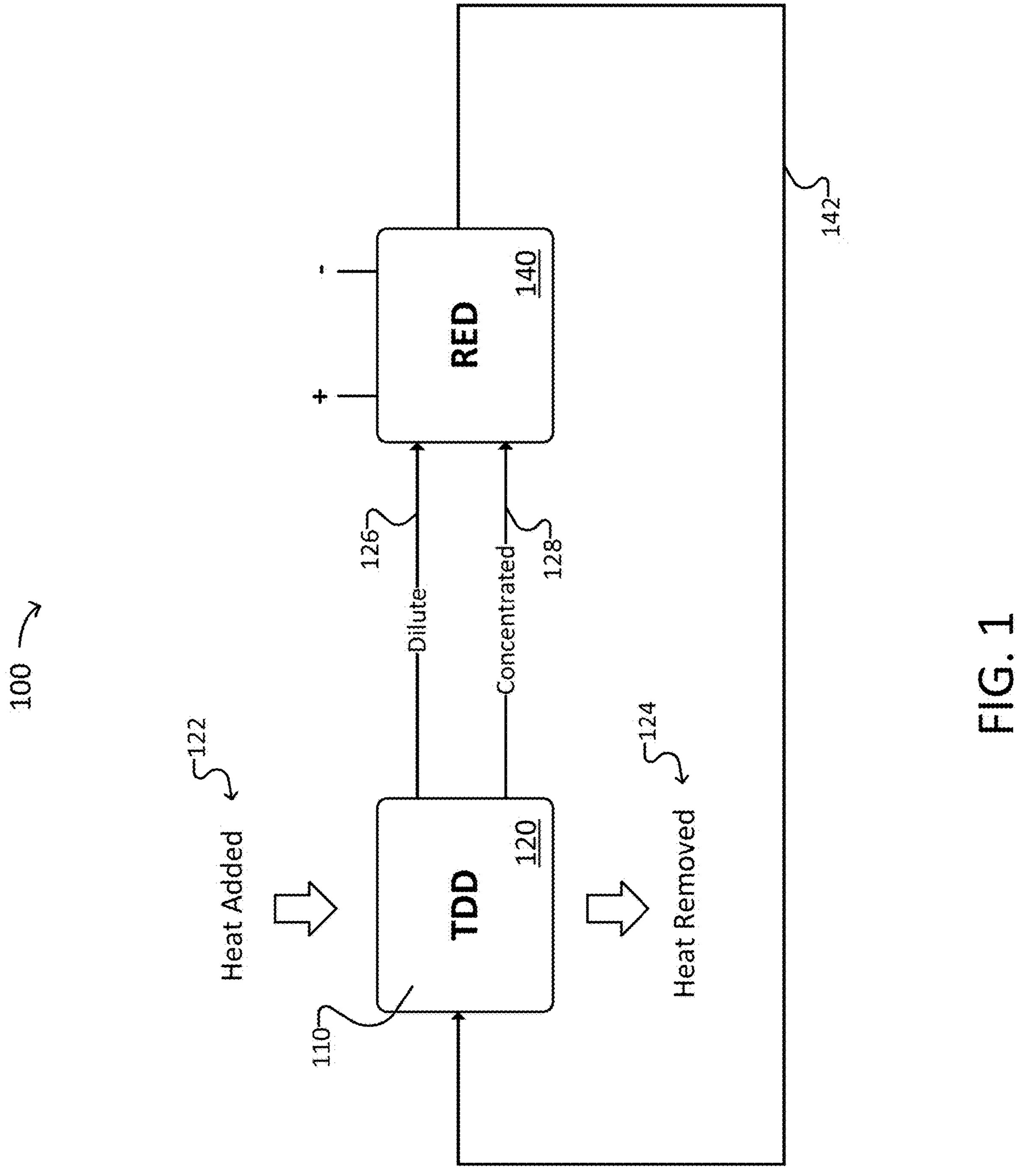
FIG. 1 illustrates an example energy-harvesting system.

As used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes the range from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other and are not necessarily "superior" and "inferior". Generally, similar spatial references of different aspects or components indicate similar spatial orientation and/or positioning, i.e., that each "first end" is situated on or directed towards the same end of the device.

The present disclosure is related to methods and systems for generating electrical power and/or hydrogen from thermal-gradient energy. The systems and methods described in this disclosure are generally directed to efficiently extracting usable energy from a difference in temperature, also known as a thermal gradient. In particular, several embodiments are described, each of which efficiently convert a thermal gradient into a salinity gradient, i.e., a difference in ion concentration between two solutions. Energy is then extracted from the salinity gradient via a precisely orchestrated and controlled mixing of the two solutions. The systems may be used to directly generate electrical power or to generate hydrogen gas, which can be used as a fuel for generating mechanical (and/or electrical) power or to generate pressure and/or gravitational potential energy, either of which can be used to drive a turbine or perform other useful work. The systems encompass a range of sizes and power outputs. Some embodiments may be configured to generate power at the scale of a single residence or commercial building. In some examples, the systems include industrial power generation systems providing electrical power to a regional or national power grid. In some examples, the systems provide hydrogen fuel, e.g., to power a fleet of vehicles, as well as (or instead of) generating electrical power.

There is a growing need for renewable energy sources that can efficiently harness natural or waste energy. Reverse electrodialysis (RED) is a process that generates electricity and/or hydrogen from the salinity gradient between saltwater and freshwater. Example RED systems and methods are disclosed in U.S. Pat. Nos. 11,502,322; 11,502,323; 11,855, 324; and 12,040,517. The entire disclosure of each of these references is hereby incorporated in their entirety. However, maintaining these salinity gradients sustainably can be a significant challenge. Current methods rely on environmental and/or geographical factors, such as river mouths meeting the sea, which limits their applicability and scalability. The disclosed embodiments address this by using sources of waste energy, such as those found in industrial processes or natural environmental conditions, to regenerate synthetic salinity gradients. Furthermore, the embodiments are integrated into RED or similar processes that generate usable energy, e.g., in the forms of electricity and/or hydrogen. For example, Liquid Natural Gas (LNG) regasification plants produce significant waste cooling and heating resources that often go unused. The embodiments disclosed in this document use these thermal gradients, with or without the assistance of a heat pump, to regenerate the salt solutions required for RED, making the process more sustainable and efficient. In certain embodiments, a humidifier, a dehumidifier, a bidirectional exhaust fan, and/or a swamp cooler may be used in connection with the heat pump to drive reverse-electrodialysis. The heat pump may be fueled by any known heat-exchange fluid, such as, but not limited to, water, refrigerant, glycol, and/or oil.

Furthermore, the embodiments disclosed in this document use these thermal gradients with or without a heat source optimization system, such as the hydronic branch valve box disclosed in U.S. patent application Ser. No. 18/186,358, hereby incorporated in its entirety. That is, a heat source optimization system may enhance the distribution of heat and/or cooling between subsystems of the energy generation system.

Figure 2:
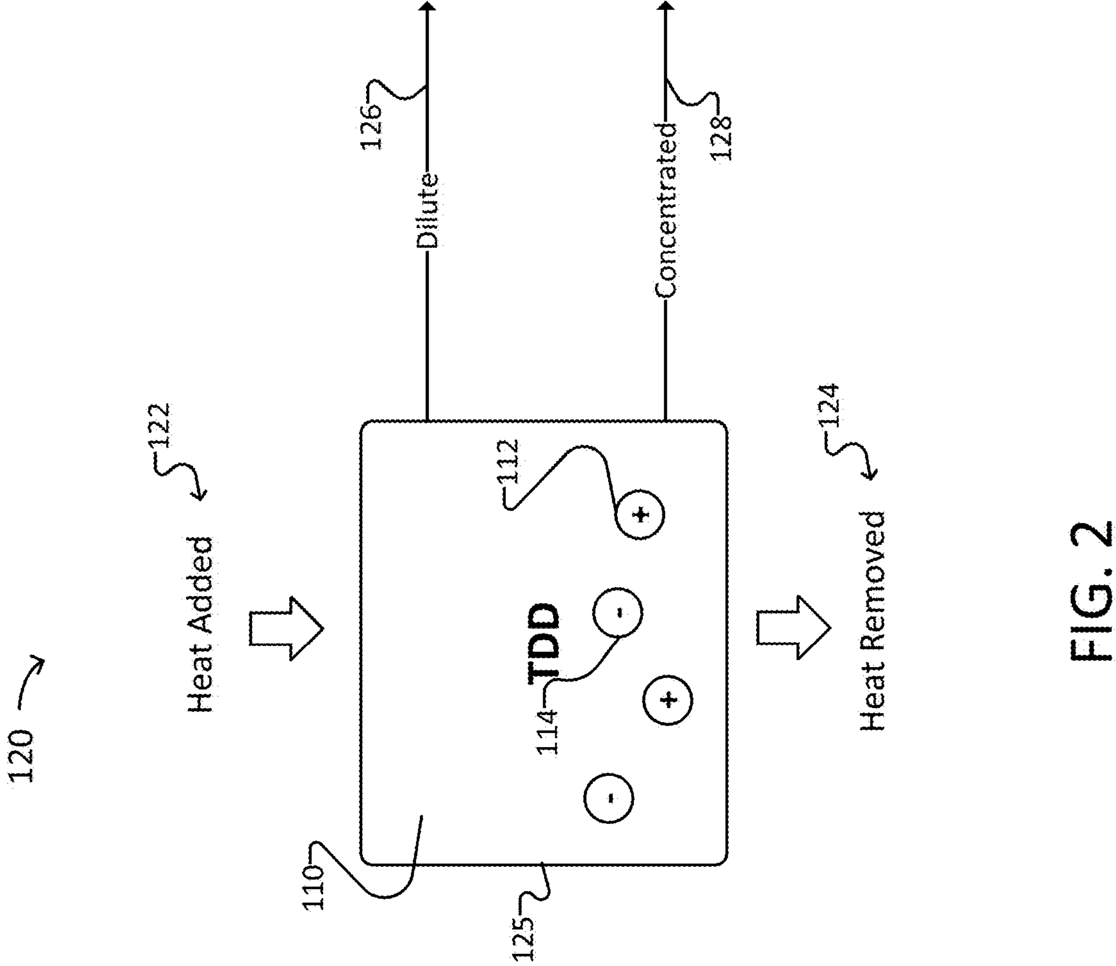
FIG. 2 shows an example Thermo-diffusion Desalination (TDD) unit.

FIG. 1 depicts a schematic diagram of an example system 100 for generating hydrogen and/or electricity using reverse electrodialysis (RED) in a closed-loop (or semi closed-loop). Although the illustrated system 100 uses a RED unit 140, systems that use Pressure-retarded Osmosis (PRO), capacitive methods or other systems to convert salinity-gradient energy to a more usable form are also within the scope of the disclosure. The example system 100 uses a Thermo-diffusion Desalination (TDD) unit 120 to generate the salinity gradient. Details of an example TDD unit 120 are shown in FIG. 2 and described in the associated written description below. From the perspective of the schematic depicted in FIG. 1, the TDD unit 120 receives heat 122 (e.g., waste heat from an industrial process) and/or cooling (e.g., waste cooling from an industrial process), causing a thermal gradient in the TDD unit 120. Due to the thermal gradient, the TDD unit 120 separates a saline solution 110 into a more concentrated stream 128 and a more dilute (less concentrated) stream 126 through a thermodiffusion process. In a thermodiffusion process, salt ions in the saline solution move to the colder side of the TDD resulting in a separation of salt concentrated stream (i.e., 128) and the diluted stream (i.e., 126). Additional embodiments which use a difference in temperature to produce a salinity gradient are also within the scope of this disclosure.

The two streams 126, 128 feed a RED unit 140 (which may include an array of individual RED cells with alternating ion exchange membranes) causing an ion gradient, i.e., separation of positively charged ion and negatively charged ions within the alternating cation and anion exchange membranes within the RED unit 140. In some examples, the system passively feeds the streams to the RED unit 140, e.g., using gravity. Alternatively, one or more streams may be forced from the TDD unit 120 to the RED unit 140 using, e.g., a mechanical device such as a pump or other active transport system. The RED unit 140 performs a controlled mixing of the two streams 126, 128 to generate electricity and/or produce hydrogen (e.g., by liberating hydrogen from water). Example RED units 140 and their operation are disclosed detail in in U.S. Pat. Nos. 11,502,322; 11,502,323; 11,855,324; and 12,040,517 and, for brevity, will not be repeated here. After the streams 126, 128 are mixed within the RED unit 140, the mixed stream 142 is fed back to the TDD unit 120. Thus, the system 100 may be operated in a closed loop, reusing the same saline solution. That is, the saline solution may be separated into concentrated 128 and dilute 126 streams by the TDD unit 120 then recombined (e.g., through mixing) in the RED unit 140 before being recirculated back to the TDD unit 120 in a mixed stream 142 to be separated again. If, however, the RED unit 140 liberates hydrogen from water molecules (e.g., through electrolysis), the system 100 will provide for making up the water lost to electrolysis (or other process that removes water from the solution). The makeup water may be freshwater from a reliable source, or it may be harvested from the atmosphere (e.g., if the ambient air has high humidity). Atmospheric water generation may be performed by using desiccants or condensation systems that absorb moisture from the air. Desiccants, such as silica gel or lithium chloride, may absorb moisture from the air; this moisture may then be released and collected as liquid water when the desiccant is heated. Alternatively, cooling the ambient air below its dew point causes water vapor to condense, producing liquid water that can be added back into the system 100 as makeup water. When the ambient air is particularly humid, direct air-water condensation is more efficient. This process involves cooling the humid air so that water vapor condenses out, providing a steady supply of clean water that can be used to replenish the low-salinity stream 126 or, e.g., to balance the overall water content of the reservoir 125. By continuously evaporating water from the high-salinity stream 128 and making up for the lost water with fresh or condensate water, the system 100 can maintain or even enhance the salinity gradient.

Referring now to FIG. 2, the TDD unit 120 includes a reservoir 125 of a saline solution 110. Heat is added to one side of the reservoir 125 and/or removed from the other side of the reservoir 125, creating a temperature gradient across the reservoir 125. The TDD unit 120 operates on the principle of thermophoresis (also known as the Soret effect). This phenomenon tends to move light molecules (or ions) to hotter regions and heavy molecules (or ions) to colder regions. In the case of saline solution 110, the dissolved salt ions 112 and 114 move toward the colder region, increasing the salinity in that region. That is, different ions and molecules migrate at different rates in response to temperature differences. Generally, solutes (e.g., salt ions 112 and 114) tend to move towards the cooler region, while solvent molecules (e.g., water) accumulate in the warmer region. In some embodiments, salt ions may include, but are not limited to, sodium ($Na^+$), potassium ($K^+$), lithium ($Li^-$), chloride ($Cl^-$), iodide ($I^-$) nitrate ($NO_3^-$), chlorate ($ClO_3^-$) hydroxide ($OH^-$), and so forth. Over time, the hotter region becomes enriched with water (dilute solution), and the cooler region becomes more concentrated with salt (concentrated solution), thereby creating a salinity gradient between the warmer region and the colder region. In some examples, the system 100 is configured to continuously circulate the solutions, ensuring a steady gradient is maintained. Dilute water accumulates in the warm region and is extracted as product water or more dilute stream 126, while the concentrated brine is collected from the cooler region as the more concentrated stream 128.

As shown, a more concentrated stream 128 of saline is drawn from the colder region of the reservoir 125 and fed to the RED unit 140. And a separate, more dilute stream 126 is drawn from the hotter region of the reservoir 125 and separately fed to the RED unit 140. In some examples, the system passively draws the streams from the reservoir 125, e.g., using gravity. Alternatively, one or more streams may be drawn from the reservoir 125 using, e.g., a mechanical device such as a pump or other active transport system. In some examples, the TDD unit 120 includes a multi-pass configuration, where saline solution 110 passes through the thermal gradient multiple times to further separate the more dilute stream 126 from the more concentrated stream 128 during each pass. Thus, the TDD unit 120 effectively creates a salinity gradient based on a thermal gradient and separates the saline solution into a more dilute stream 126 and a more concentrated stream 128. Furthermore, saline solution 110 remains in liquid form during the separation process. That is, the RED unit 140 does not rely on evaporation or condensation for its operation. Thus, the separation results in a change in sensible enthalpy rather than latent enthalpy. Nor does the TDD unit 120 require a membrane or ion-adsorbing materials to affect or maintain the separation of the streams 126 and 128. And the TDD unit 120 may operate with only a modest thermal gradient, although such operation may reduce the rate of separation and/or require a multi-pass configuration.

Virtually any source of heat 122 may be added to the TDD unit 120, including, but not limited to, solar energy, industrial waste heat, or even electrical heaters and any combination of these sources and others. Similarly, a wide variety of methods may be used to remove heat 124 from the TDD unit 120, including, but not limited to, exposing the TDD unit 120 to the ambient environment, water cooling, evaporative cooling (of, e.g., water or a gas such as natural gas), refrigeration, etc. and combination of these and other heat sinks. The magnitude of the thermal gradient is based on the amount of heat added 122 and/or removed 124, limited only by the boiling and freezing points of the saline solution in the TDD unit 120. For example, in an industrial setting having both waste heat and cooling water as a natural cooling source, a TDD unit 120 may use this difference in temperature to create the thermal gradient across the saline solution. As a result, concentrated and dilute streams 126, 128 are created, thus regenerating the salinity gradient for the RED unit 140.

Figure 3:
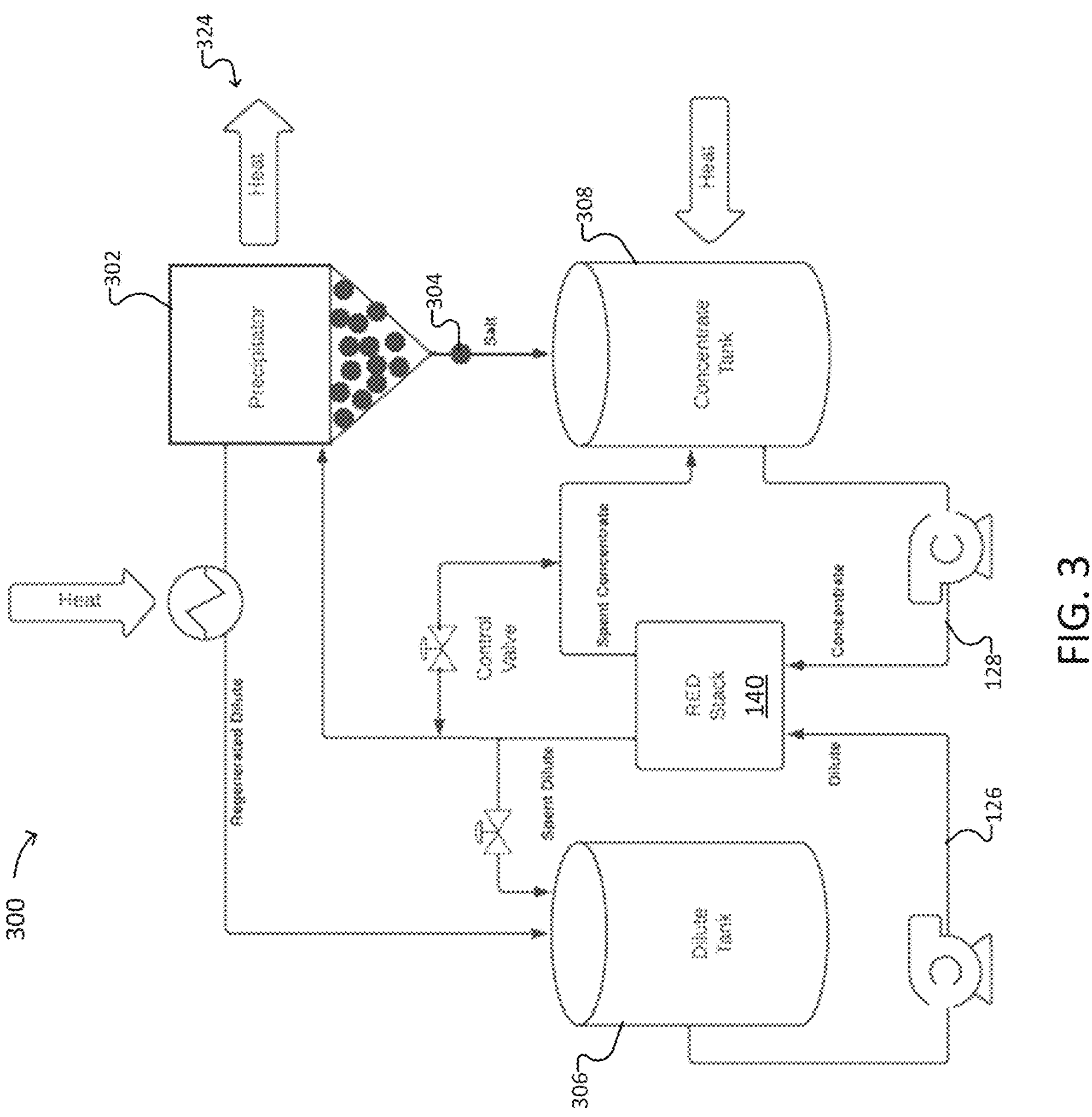
FIG. 3 shows an example embodiment including a salt precipitation system.

In another embodiment, the system 100 uses a salt precipitation system (300, FIG. 3) to generate the salinity gradient, rather than the TDD unit 120 of FIG. 1. That is, heat 324 may be removed from the saline solution, causing salt 304 to precipitate from precipitator 302, e.g., forming solid crystals, thus decreasing the salinity. The precipitated salt 304 can then be separated, e.g., via filtering or sedimentation, resulting in a more dilute stream 126 being routed to dilute tank 306 and into RED unit 140. The separated salt is then reintroduced to the undiluted saline solution in concentrate tank 308, resulting in a more concentrated stream 128 which is routed to RED unit 140. In some examples, heat is added to the more concentrated stream 128 to facilitate dissolving the salt into ions, further increasing the salinity difference with respect to the more dilute stream 126. For example, in a liquid natural gas (LNG) regasification plant, the cooling energy released during the conversion of LNG to natural gas can be used to cool a Potassium-Nitrate solution. As the temperature drops, $KNO_3$ precipitates out of the solution. These crystals can then be collected and exposed to heat from the plant's waste heat recovery system to re-dissolve the crystals, regenerating the concentrated saline solution 128 for the RED unit 140.

Figure 4:
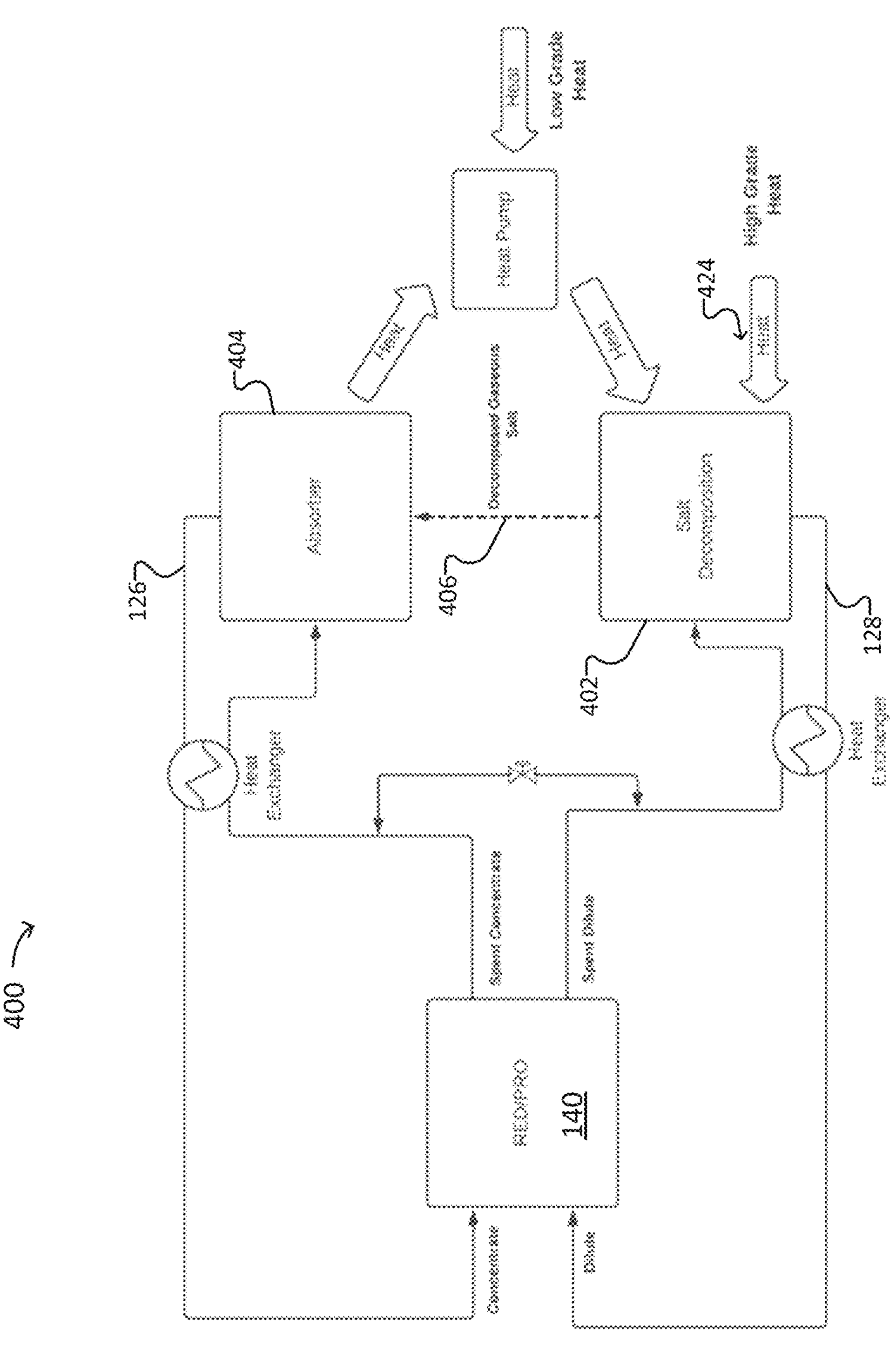
FIG. 4 shows an example embodiment including a salt-decomposition system.

In another embodiment, the system 100 uses a salt decomposition system (400, FIG. 4) to generate the salinity gradient, rather than the TDD unit 120 of FIG. 1. That is, heat 424 may be added to a saline solution having a solute that is amenable to decomposition in 402. For example, when heated above 35 degrees C., ammonium bicarbonate ($NH_4HCO_3$) decomposes into ammonia gas ($NH_3$), carbon dioxide gas ($CO_2$), and water ($H_2O$). The gaseous products, ammonia and carbon dioxide, are separated from the remaining water in "salt decomposition". A gas collection system 404, i.e., "absorber" may capture the decomposed gases 406 as they evolve from the heated solution. The captured gases 406 are either stored or directed to the more concentrated saline solution stream 128. The collected gases may then be cooled, e.g., by exposure to a cooler environment, using ambient air, or other natural cooling heat sink(s). As the gases cool down, they may be absorbed back into solution, creating the more concentrated stream 128.

Figure 5:
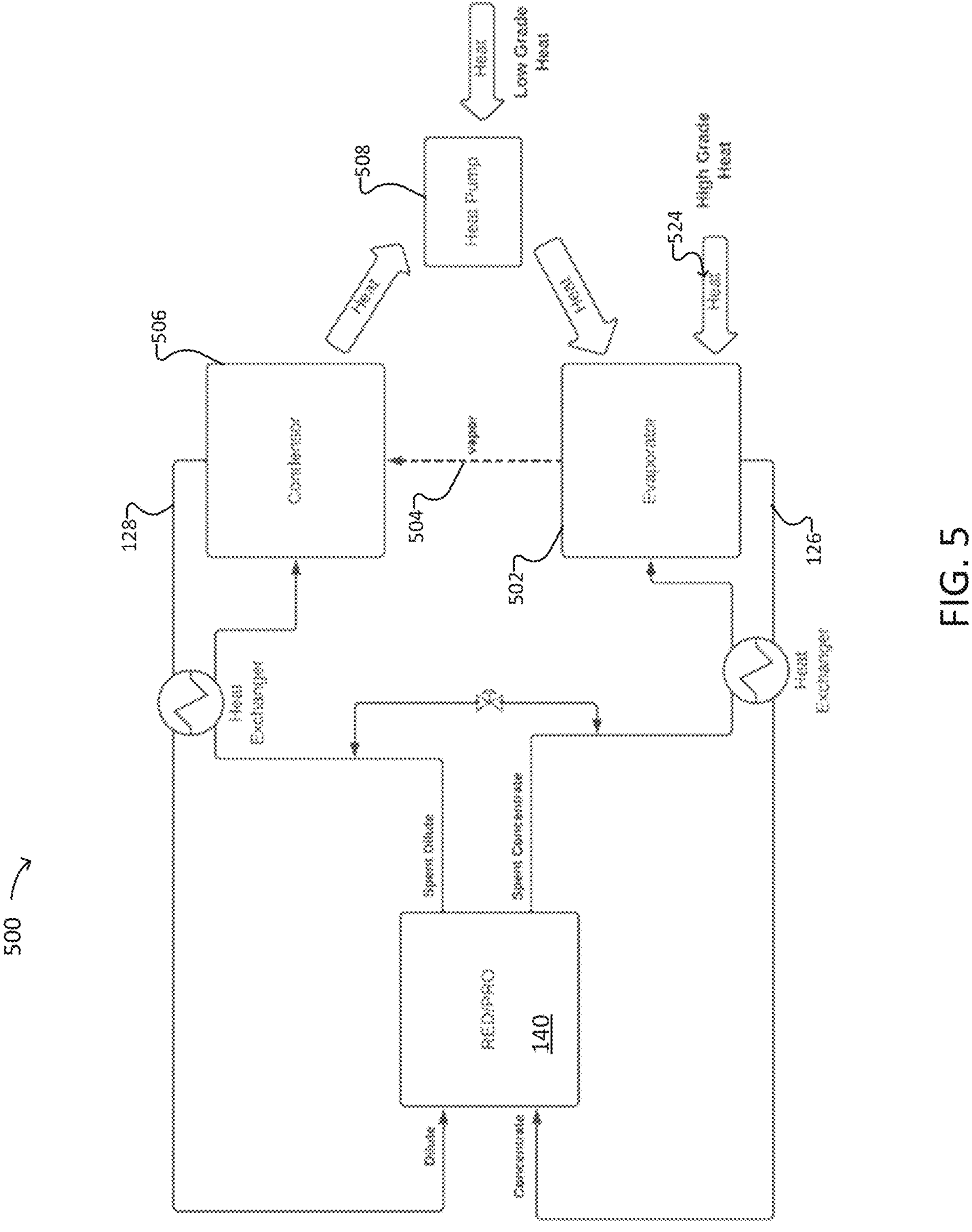
FIG. 5 shows an example embodiment including a evaporation system.

In another embodiment, the system 100 uses an evaporation system (500, FIG. 5) to generate the salinity gradient, rather than the TDD unit 120 of FIG. 1. That is, the evaporation method uses thermal energy to remove water from the salt solution, increasing the concentration of the salt. During a heating phase, salt solution is subjected to heating 524 using sources such as solar energy, geothermal energy, or industrial waste heat. As the solution heats up, water begins to evaporate. The energy from the heat source provides the necessary energy for the water molecules in 502 to transition from a liquid to a gaseous state. As water evaporates, the concentration of the salt in the remaining solution in 502 increases. The evaporated water is collected as water vapor 504. The water vapor 504 produced during evaporation may be condensed back into liquid water in condenser 506 which may be routed as stream 126. This can be achieved by cooling the vapor using ambient air or other cooling systems such as heat pump 508. The condensation process releases the latent heat of vaporization, converting the vapor back into liquid water. If the evaporation process leaves behind solid salt crystals in the evaporator, these crystals can be collected and dissolved with the solution to create a highly concentrated salt solution which is routed as stream 128. The thermal energy used in the evaporation process helps to achieve the desired saline concentration gradient. In one example, in arid regions with abundant sunlight, solar thermal energy can be used to heat a concentrated solution in the evaporator. The water evaporates, leaving behind a concentrated brine, i.e., maintaining/producing a highly concentrated stream 128. Separately, ambient air can facilitate the condensation of water vapor in the condenser and provide, dilute stream 126 to the RED unit 140.

In another embodiment, the system 100 uses a Temperature Swing Solvent Extraction (TSSE) system (not shown) to generate the salinity gradient, rather than the TDD unit 120 of FIG. 1. TSSE is both membrane-less and non-evaporative. TSSE uses the temperature-dependent solubility water or salt in a solvent to facilitate the separation of salt from water. During a cooling phase, a temperature-dependent solvent is introduced to a diluted salt solution at a lower temperature. The solvent selectively absorbs the salt (or, depending on the solvent used, the water) from the solution. This absorption process is enhanced by the lower temperature, which increases the solvent's affinity for the salt ions (or water). The solvent, now rich in salt (or rich in water), is separated from the remaining solution. The salt-rich (or water-rich) solvent is then heated using a thermal source such as industrial waste heat or geothermal energy. As the temperature rises, the solvent's ability to hold the solute decreases. The thermal energy causes the solvent to release the solute. In the case of a salt solute, the absorbed salt is released into a smaller volume of water, creating a highly concentrated salt solution. The separation of the solvent from the solute is facilitated by the increased temperature, which reduces the solubility of the solute. The remaining solution (with reduced solvent) is cooled down and recycled back to the absorption step. The cooling restores the solvent's ability to absorb solvent in the next cycle.

In an example using ionic liquids as the solvent, the TSSE process can be applied in an industrial facility where waste heat is available. The ionic liquid absorbs the salt at lower temperatures and releases it upon heating, regenerating a salt concentrated stream 128 for the RED unit 140. In another example, a temperature-dependent amine solvent is added to a hypersaline brine. As the low-polarity solvent is immiscible with the brine, the lighter amine solvent floats on top of the brine. Then, due to the hydrophilic properties of the solvent, it extracts water from the saline feedwater, leaving behind a dewatered concentrate. The concentrate is decanted, and the water-in-solvent extract is heated from room temperature to around 60 degrees C. (the temperature swing). The solubility of water in the solvent decreases with the increasing temperature, causing the water to separate from the solvent. This desalinated product water is then decanted from the solvent.

In another embodiment, the system 100 uses a Membrane Distillation (MD) system (not shown) to generate the salinity gradient, rather than the TDD unit 120 of FIG. 1. MD uses a hydrophobic membrane and a temperature gradient to separate water vapor from a saline solution, concentrating the salt solution. This membrane only allows water vapor to permeate through, preventing liquid water from passing through. Because this process operates on a difference in vapor pressure, the water can boil at temperatures below 100 degrees C. During a heating phase, a diluted salt solution is heated on one side of a hydrophobic membrane. The heat can come from solar energy, industrial waste heat, or geothermal energy. As the temperature of the solution increases, water molecules evaporate and transition into the vapor phase. The hydrophobic membrane allows water vapor to pass through while blocking the liquid phase and dissolved salts. The thermal energy provides the necessary energy for water molecules to evaporate and permeate the membrane. On the other side of the membrane, the water vapor condenses back into liquid water. This side is maintained at a lower temperature using, e.g., ambient air or a cooling system. The cooling causes the water vapor to release its latent heat and condense. The condensed water is collected as pure water (or at least as dilute stream 126), while the remaining solution on the heated side becomes more concentrated with salt, i.e., stream 128. The process effectively increases the concentration of the salt solution on the heated side and produces pure water for use on the dilute side, regenerating the salinity gradient required for the RED unit 140.

In some examples, the system 100 may include one or more refrigeration systems, e.g., as a heat source or heat sink, and/or to enhance or augment the transfer of heat between subsystems. In cold refrigeration systems, increasing the efficiency of the vapor compression cycle can be achieved by raising the suction temperature entering the compressor. This increase in suction temperature results in a higher specific enthalpy of the refrigerant entering the compressor, which reduces the density of the refrigerant vapor and subsequently decreases the work required by the compressor to compress the vapor to the desired condensing pressure. One way to achieve this is by incorporating a suction superheater, which can use heat from various sources to increase the temperature of the refrigerant before it enters the compressor. The RED process typically requires a salinity gradient to transfer ion mobility across its membranes, which in turn drives the generation of electricity. By integrating the RED system with the refrigeration cycle, the cooling side of the refrigeration system can be used to provide the necessary temperature gradient for RED, effectively utilizing "free cooling" to regenerate the salinity gradient. The heat absorbed by the refrigerant in the suction superheater not only increases the suction temperature but also assists in maintaining the desired temperature differential in the RED process, improving overall system efficiency. On the condenser side of the vapor compression cycle, there is also an opportunity to enhance efficiency by subcooling the liquid refrigerant. The condenser, which rejects heat to the environment, can be used to provide this subcooling, taking advantage of the "free heating" available as the refrigerant transitions from a high-pressure vapor to a high-pressure liquid. Subcooling the liquid refrigerant before it enters the expansion valve increases the refrigerant's enthalpy, meaning it can absorb more heat in the evaporator, thus improving the overall cooling capacity of the system without increasing the energy input. By strategically managing both the suction superheating and condenser subcooling processes, the efficiency of the vapor compression cycle can be significantly improved. This approach not only reduces the compressor's energy consumption by lowering the compression ratio but also optimizes the system's thermal balance. When coupled with a RED system, the refrigeration cycle's inherent heat-transfer processes can be leveraged to enhance both cooling and power generation, leading to a more energy-efficient and integrated thermal management system.

Figure 6:
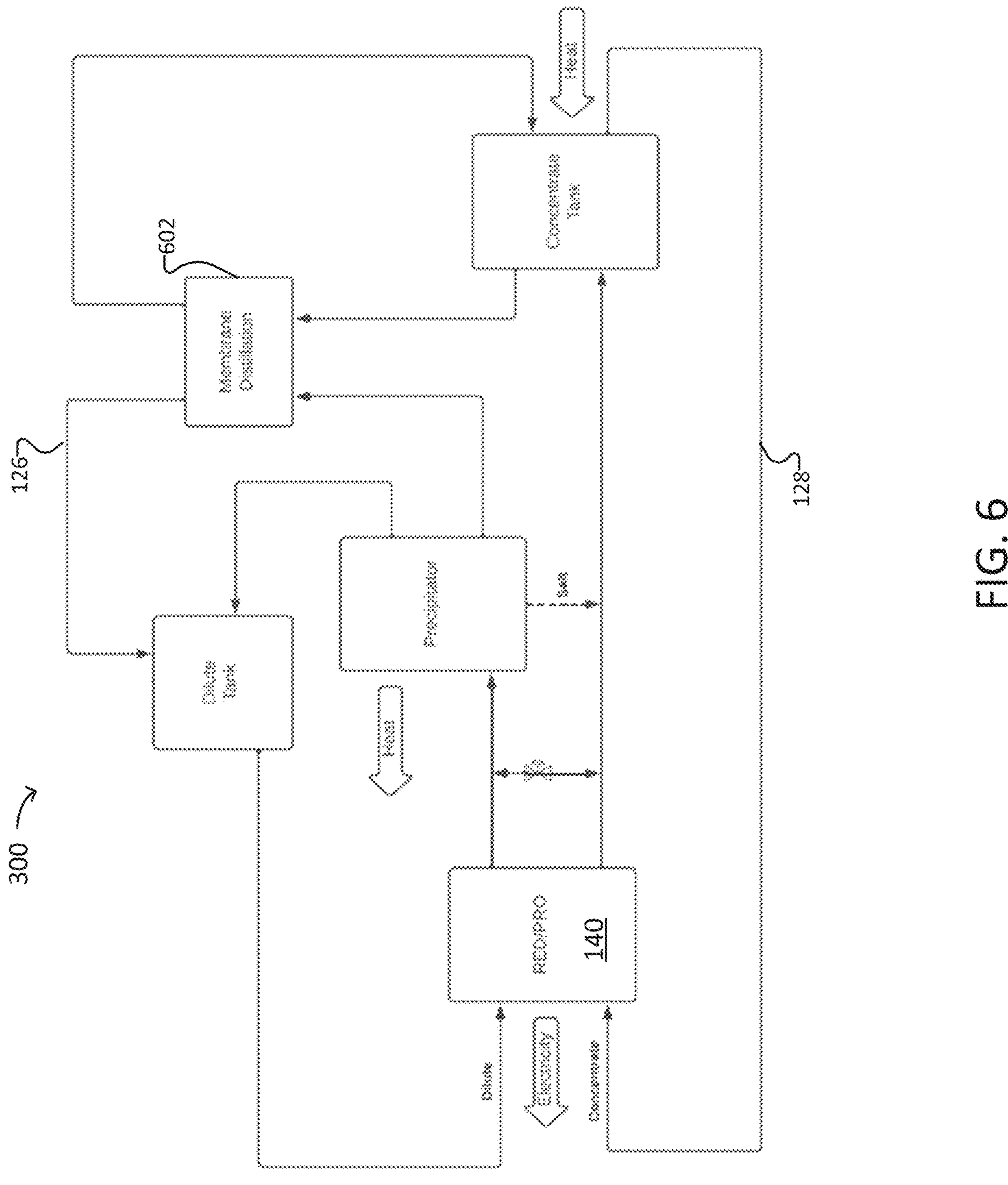
FIG. 6 shows an example embodiment including a membrane distillation system.
Figure 7:
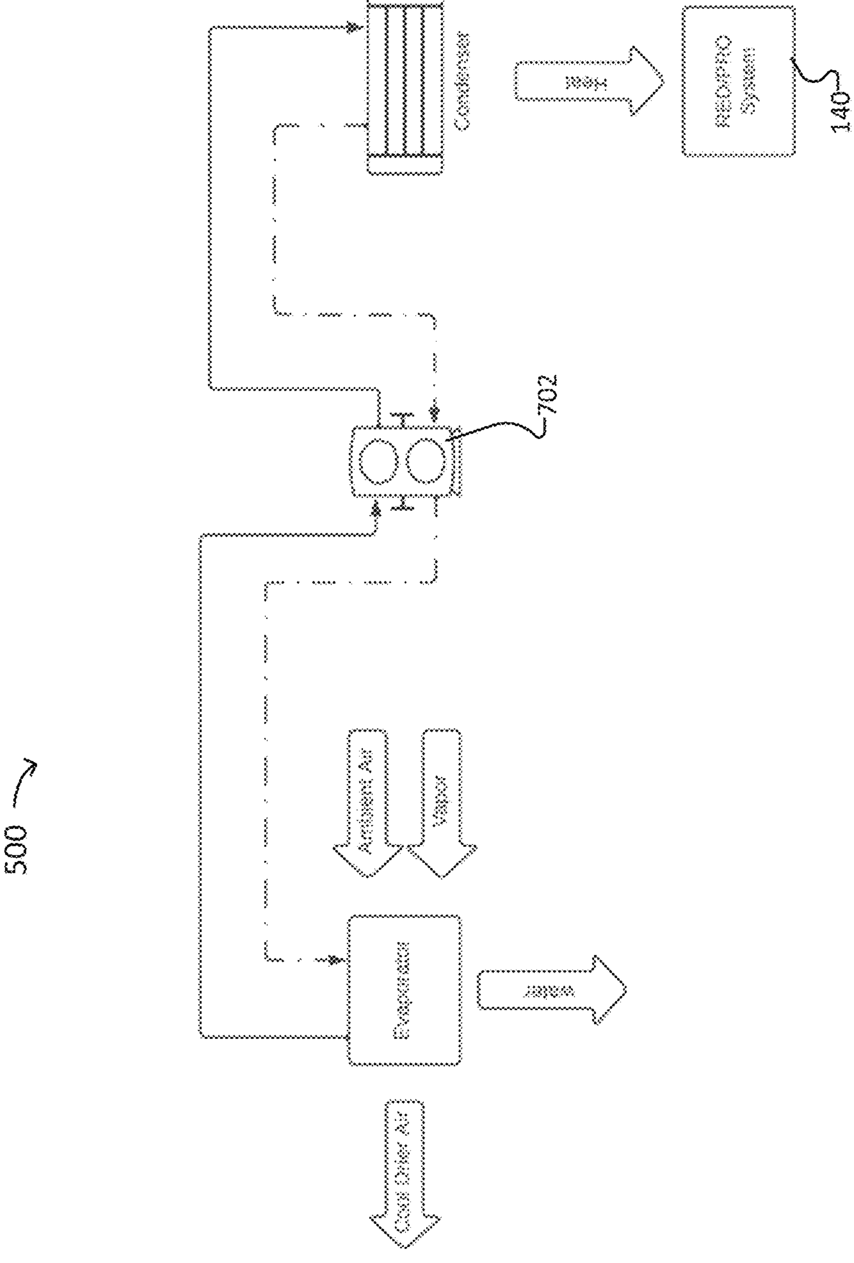
FIG. 7 shows an example embodiment including a heat-pump system.

In some examples, MD 602 is used to enhance the salinity gradient generated by other means (such as TDD, TSSE, precipitation, evaporation, decomposition, etc.). FIG. 6 shows an example precipitation system 300 enhanced by MD 602. Furthermore, the system 100 may include one or more heat pumps configured to enhance any subsystem. FIG. 7 shows an example evaporation system 500 enhanced or augmented by a heat pump 702. The system 100 may also include any combination of subsystems including, but not limited to TDD, TSSE, precipitation, evaporation, decomposition, etc. as described above, any one of which may be augmented and/or enhanced by MD and/or one or more heat pumps. The integration of these processes and systems—evaporation, condensation, and makeup water introduction—enables the system 100 to continuously regenerate its synthetic salinity gradient. This ensures that the system can operate efficiently over extended periods, leveraging ambient heat and humidity as sustainable resources for maintaining the necessary conditions for power generation. Moreover, this method is particularly beneficial in regions with abundant sunlight or waste heat, as it capitalizes on readily available natural resources to optimize the RED process.

A non-exhaustive list of heat sources and sinks includes industrial sources, such as power plants. Power plants may include nuclear power plants (e.g., having cooling water in the 30 to 50 degree C. range), fossil fuel power plants (e.g., having flue gases in the 100 to 200 degree C. range and/or cooling water in the 30 to 40 degree C. range), and/or geothermal power plants (e.g., having geothermal brine in the 60 to 170 degree C. range). Industrial sources may also include oil and gas facilities. Oil and gas facilities may include refineries (e.g., having process heat in the 50 to 150 degree C. range and/or cooling water, e.g., in the 25 to 40 degree C. range), Liquefied Natural Gas (LNG) facilities (e.g., having waste cooling from regassification in the −160 to −30 degree C. range), and/or offshore platforms of various types (e.g., having seawater cooling in the 10 to 25 degree C. range).

Industrial sources may also include chemical reactors and/or distillation columns. Chemical reactors may include exothermic-reaction heat (e.g., in the 50 to 200 degree C. range) and/or endothermic-reaction heat (e.g., in the 0 to 50 degree C. range). Distillation columns may include overhead vapors (e.g., in the 80 to 150 degree C. range) and/or bottom reboilers (e.g., in the 150 to 200 degree C. range). In the metallurgical industry, industrial sources may include steel mills (e.g., having blast furnace exhaust gases in the 200 to 500 degree C. range and/or cooling water in the 30 to 50 degree C. range) and/or aluminum smelters (e.g., having electrolysis cell heat in the 70 to 100 degree C. range). In the food and beverage industry, industrial sources may include breweries (e.g., having fermentation heat in the 30 to 40 degree C. range), distilleries (e.g., having distillation waste heat in the 80 to 100 degree C. range), and/or dairy processing facilities (e.g., having pasteurization heat in the 70 to 90 degree C. range and/or cooling water in the 10 to 20 degree C. range).

In the pulp and paper industry, sources include dryer exhaust (e.g., in the 60 to 100 degree C. range) and/or black liquor obtained from pulp digestion, such as the Kraft process (e.g., in the 80 to 150 degree C. range). In the textile industry, sources include process water from dying and finishing (e.g., in the 40 to 100 degree C. range), and/or condensate from steam generators (e.g., in the 50 to 100 degree C. range). In the cement industry, sources include kiln exhaust gases (e.g., flue gases in the 200 to 400 degree C. range).

A non-exhaustive list of natural heat sources and sinks includes geothermal sources, such as hot springs (e.g., having surface water in the 30 to 90 degree C. range) and/or geothermal wells (e.g., having subsurface water in the 60 to 200 degree C. range). Natural sources also include solar ponds, such as stratified ponds (e.g., having liquid temperatures in the 30 to 80 degree C. range) and/or solar thermal collectors (e.g., having temperatures up to 200 degrees C. or even more). Ambient air temperature may vary between 0 and 40 degrees C. depending on, e.g., the location, season, and altitude. Higher altitude regions may have lower temperatures (e.g., only up to about 15 degrees C.). Oceans, seas, and other large bodies of water may provide surface water having temperatures in the 0 to 30 degree C. range (e.g., depending on latitude, prevailing currents, etc.). Thermocline layers may have lower temperatures (e.g., in the 4 to 15 degree C. range). Thermohaline circulation is associated with temperature gradients between surface water and deep water (e.g., in the 0 to 25 degree C. range). Rivers, lakes, and other smaller bodies of water may have similar, albeit potentially lower, temperature ranges. For example, surface water may be in the 0 to 25 degree C. range and may vary seasonally, e.g., depending on latitude). Groundwater may have a more consistent year-round temperature, e.g., in the 10 to 15 degree C. range).

A non-exhaustive list of urban and waste sources may include district (or municipal) heating and/or cooling. An urban heat network may include heated water in the 60 to 100 degree C. range, and chilled water in the 5 to 15 degree C. range. Data centers may include computer server cooling infrastructure (e.g., having hot air exhaust in the 30 to 40 degree C. range and/or cooling water in the 20 to 30 degree C. range). Wastewater treatment plants may have treated effluent (e.g., in the 10 to 20 degree C. range). And Biogas plants may have digestate (e.g., in the 30 to 50 degree C. range). Municipal solid-waste facilities may have incinerator flue gases (e.g., in the 200 to 300 degree C. range) and/or generated steam (e.g., in the 150 to 200 degree C. range).

A non-exclusive list of renewable energy systems includes solar-thermal power plants, wind turbines, and hydroelectric power plants. Solar-thermal power plants may have various heat-transfer fluids such as thermal oils or molten salts (e.g., having temperatures in the 200 to 400 degree C. range). Wind Turbines may produce waste heat from generators (e.g., in the 30 to 50 degree C. range). And hydroelectric power plants may have turbine-cooling water (e.g., in the 10 to 20 degree C. range).

The transportation sector may also provide heat sources and sinks including, but limited to sources and sinks related to automobiles, aerospace, and marine vessels. For example, automobiles may include engine cooling systems (e.g., having coolant in the 80 to 100 degree C. range) and/or engine exhaust gases in the 150 to 400 degree C. range. Marine vessels may also have engine cooling systems (e.g., having coolant in the 10 to 50 degree C. range) and/or engine exhaust gases in the 200 to 400 degree C. range. Jet aircraft engine exhaust may be in the 500 to 900 degree C. range and associated engine cooling systems may have coolant in the 80 to 120 degree C. range. Radiative cooling systems (e.g., systems that include sky-facing surfaces that are configured to largely reflect sunlight and/or to transmit infrared light) may include surfaces that are cooled below ambient temperatures (e.g., in the range of 10 to 25 degrees C. below ambient).

The agricultural sector may also provide heat sources and sinks including, but not limited to, sources and sinks related to greenhouses and/or animal husbandry, among others. For example, greenhouses which regulate their temperature and humidity may include heating systems (e.g. in the 20 to 30 degrees C. range). Greenhouses may also include composting operations (e.g., producing composting heat in the 50 to 70 degree C. range). Animal husbandry operations may include, e.g., biogas plants, which may include digestate heat as described above with respect to urban and waste sources.

Miscellaneous sources and heat sinks may include, without limitation, thermoelectric generators, industrial refrigeration, medical facilities, and even commercial kitchens. For example, thermoelectric generators (e.g., Seebeck generators) may have residual “hot side” heat (e.g., in the 100 to 300 degree C. range). Industrial refrigeration systems may have condenser units that remove heat from the refrigerant (e.g., at a temperature in the 30 to 40 degree C. range). Industrial refrigeration systems may also have evaporator units (e.g., at a temperature in the 0 to 10 degrees C. range). Medical facilities may include sterilization equipment such as autoclaves that produce steam and/or heat (e.g., in the 120 to 140 degrees C. range). Commercial kitchens may include a variety of ovens, ranges, and other cooking and heating devices (e.g., in the 80 to 300 degrees C. range). Even radioisotope thermoelectric generators (RTGs) may be used as a heat source.

The system may use these examples and more, alone or in any combination, to add heat to, or remove heat from, the TDD (or equivalent salinity-gradient-generating system).

In a specific example, based on oil-well drilling, as drilling operation goes deeper into the Earth's crust, the temperature naturally increases due to geothermal gradients, with temperatures potentially reaching hundreds of degrees Celsius. This geothermal heat is a primary source that can be captured by installing heat exchanger systems around the drill string or wellbore. These heat exchangers may circulate fluids that absorb the geothermal heat as they pass through the hot regions surrounding the wellbore. Additionally, in some cases, Enhanced Geothermal Systems (EGS) can be employed to inject water into hot rock formations, further boosting heat extraction with secondary and tertiary recovery. The heat captured from these geothermal sources can be directly utilized in the RED process, where it can increase the temperature differential between water streams and/or solubility of the saline streams, thereby enhancing the efficiency of the synthetic salinity gradient required for energy generation. Natural gas may be extracted from the ground by drilling into natural gas reservoirs, where the gas is typically under high pressure. Once the gas is brought to the surface, it can be processed to remove impurities and then compressed to increase its pressure for transportation. If there is a nearby well that is at a lower pressure, the natural gas can be directed back down into this well through a process known as gas reinjection. This involves compressing the gas to overcome the pressure differential and then injecting it into the lower-pressure reservoir or depleted well. Gas reinjection is often used in enhanced oil recovery operations to maintain reservoir pressure and increase the extraction of oil, or to store gas for future use. By carefully managing the pressure and flow rates, the gas can be safely and efficiently reinjected into the subsurface while recovering heat.

Another significant source of heat in drilling operations is flare gas, which is often burned off in large quantities. Flaring, while a safety measure to release excess natural gas, generates considerable heat. This heat may be recovered by installing flare gas heat recovery units, which typically use heat exchangers to transfer the radiant heat from the flare stack to a working fluid. In some setups, flare gas can be directed to a Combined Heat and Power (CHP) unit, where it is burned to generate electricity while simultaneously recovering heat from the exhaust gases. The captured heat from flaring can be used to preheat the water streams entering the RED system, further enhancing the thermal gradient essential for efficient power generation. The motors and engines used in drilling operations, such as diesel or natural gas engines, also generate substantial waste heat through combustion and friction. This waste heat may be harnessed through engine exhaust heat recovery systems, which capture the heat from the engine's exhaust gases using heat exchangers or heat recovery steam generators (HRSGs). Additionally, the cooling systems of these engines can be tapped to recover lower-grade heat, which can be used in conjunction with other heat sources in the RED process. By capturing and utilizing the heat generated by these engines, the overall efficiency of the system can be improved, as this heat can be directed into the RED process to help maintain or boost the temperature differential.

Produced water, which is often brought to the surface during oil extraction, is another potential heat source. This water is typically hot due to the geothermal heat it absorbs underground. By implementing a heat exchanger, the heat from the produced water may be transferred to the water streams used in the RED process. If the heat from produced water is not immediately needed, it may be stored in a thermal storage system for later use, ensuring that this energy is not wasted and can be used when the demand in the RED process is higher. In addition to these sources of heat, the methane and natural gas encountered during drilling operations offer further opportunities for energy recovery. Methane, a significant component of natural gas, may be used to run gas engines or turbines that generate electricity for drilling operation. In a cogeneration setup, these engines or turbines may produce both electricity and heat, the latter of which can be recovered from exhaust gases and cooling systems. The high-grade heat captured from the engine's exhaust gases, for instance, may be used to create or maintain the thermal gradient in the RED process, while lower-grade heat from the cooling system may preheat water streams, further enhancing the thermal gradient.

Figure 8:
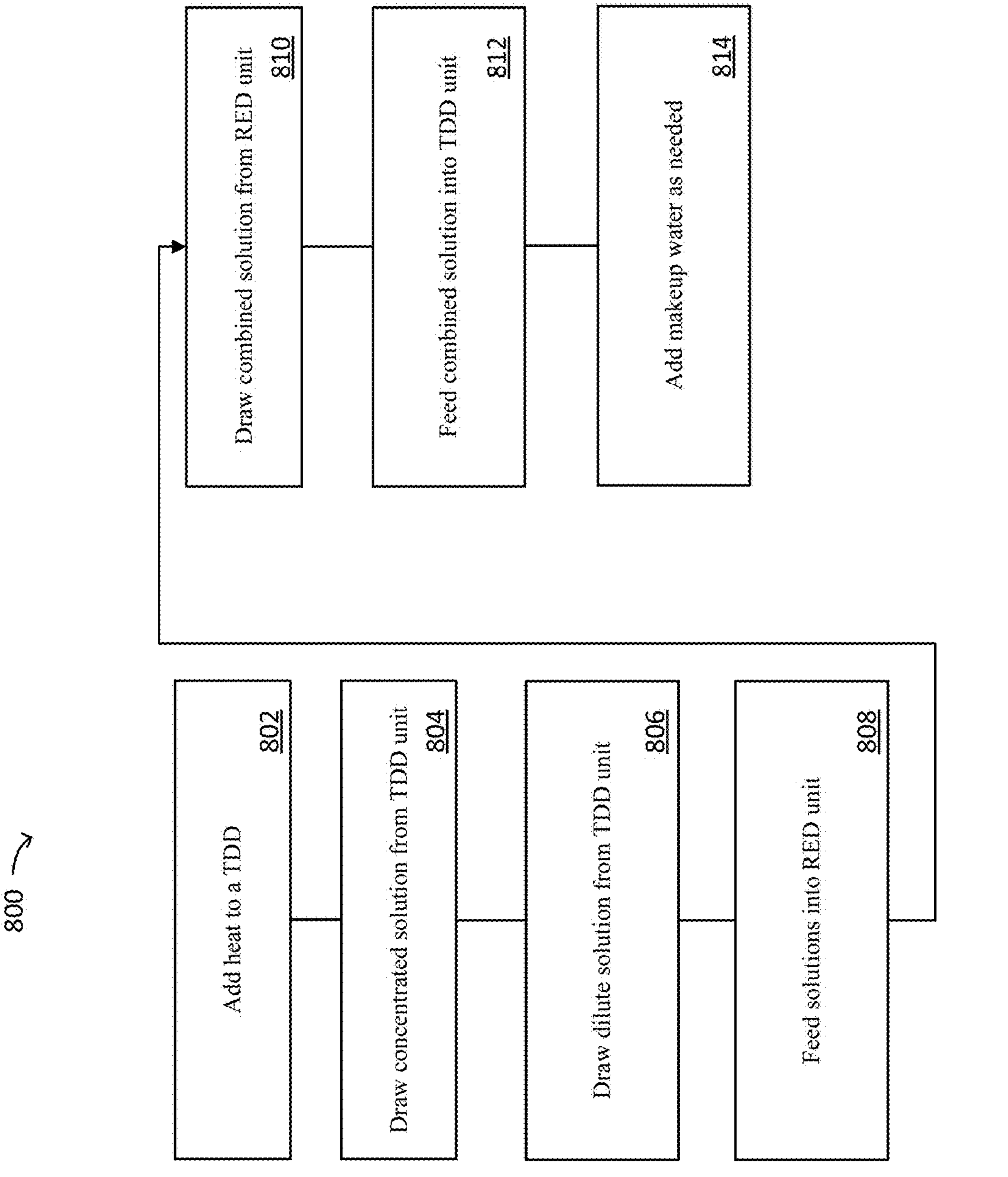
FIG. 8 shows a flowchart of a method of generating electricity.

FIG. 8 shows an example flowchart 800 of a method of generating electricity. At step 802, the method includes adding heat to, or removing heat from, a thermal diffusion (TDD) unit 120 to create a thermal gradient across a reservoir of a saline solution. In some examples, the TDD may be replaced by a salt precipitation unit, an evaporation unit, a decomposition unit, or any other system configured to separate a saline solution into more concentrated and less concentrated pools or streams. At step 804, the method includes drawing a more concentrated saline solution from a cooler region of the reservoir (e.g., using a pump, gravity, or the like, as discussed above). For example, the saline solution may naturally become more concentrated in or near the cooler region due to the Soret effect. At step 806, the method includes drawing a less concentrated saline solution 126 from a warmer region of the reservoir 125, e.g., nearer to where the heat was applied in step 802 (e.g., using a pump, gravity, or the like, as discussed above). At step 808, the method includes feeding the more concentrated saline solution 128 and the less concentrated saline solution 126 into a reverse electrodialysis unit 140 (e.g., using a pump, gravity, or the like, as discussed above), causing the reverse electrodialysis unit 140 to produce the electricity based on a controlled mixing of the more concentrated saline solution 128 with the less concentrated saline solution 126. At step 810, the method includes drawing, from the reverse electrodialysis unit 140, a combined saline solution comprising the mixed more concentrated saline solution 128 and less concentrated saline solution 126. At step 812, the method includes feeding the combined saline solution drawn from the reverse electrodialysis unit 140 back to the thermal diffusion unit 120, thus closing the loop. That is, the saline solution fed back into the thermal diffusion unit 120 is substantially the same as a combination of the less dilute 128 and more dilute 126 solutions drawn from the thermal diffusion unit 120 in steps 804 and 806. If, however, water is lost in the process, then makeup water is added at step 814.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a RED battery, a PRO system, a capacitive mixing (CAP) system, a hydrogen generation subsystem, a salt precipitation subsystem, an evaporation subsystem, etc.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Figure 9:
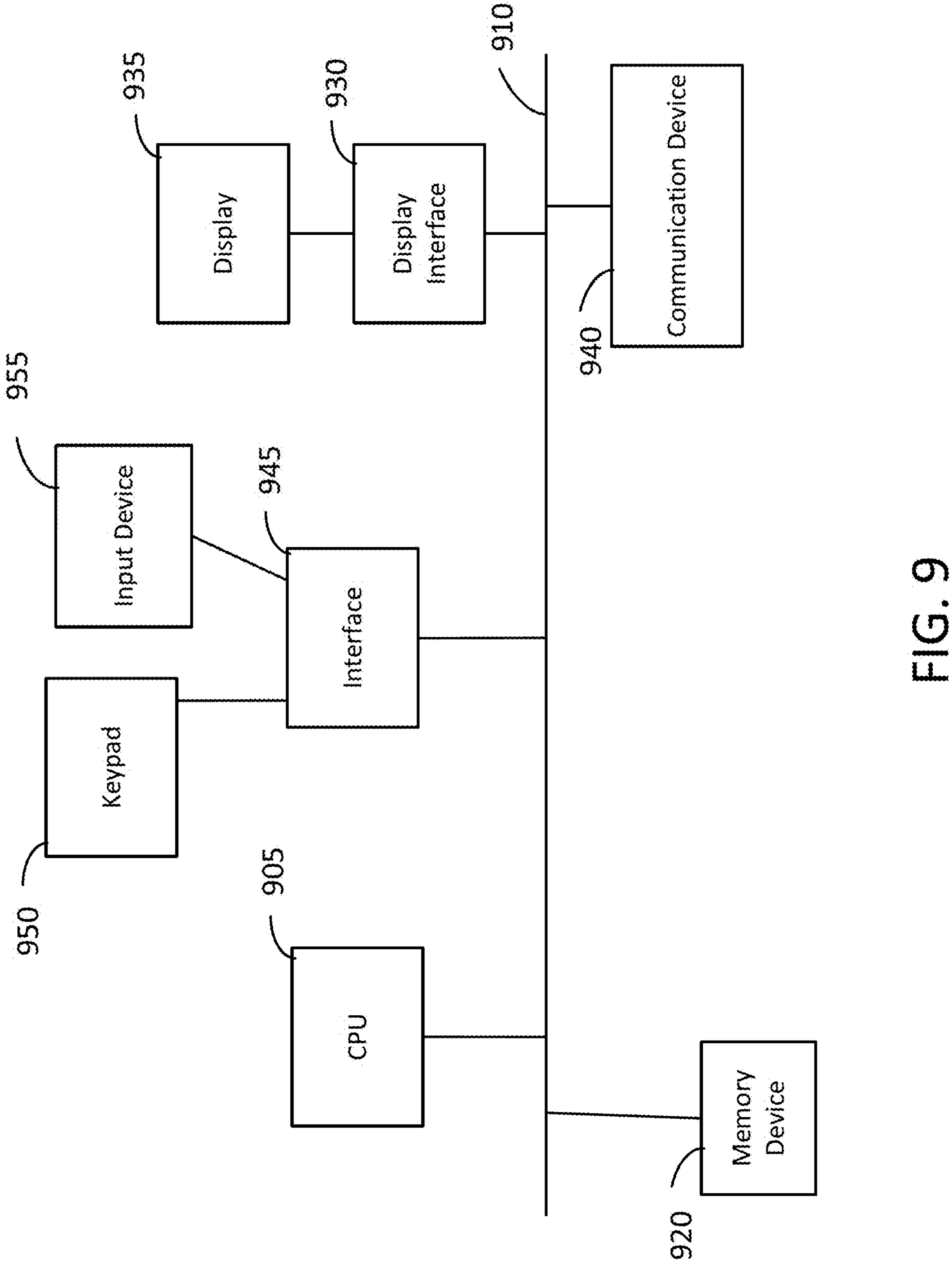
FIG. 9 illustrates example hardware that may be used in an embodiment.

FIG. 9 illustrates example hardware that may be used to contain or implement program instructions. A bus 910 serves as the main information highway interconnecting the other illustrated components of the hardware. Central Processing Unit (CPU) 905 is the central processing unit of the system, performing calculations and logic operations required to execute a program. CPU 905, alone or in conjunction with one or more of the other elements disclosed in FIG. 9, is an example of a processor as such term is used within this disclosure. Read only memory (ROM) and random-access memory (RAM) constitute examples of non-transitory computer-readable storage media 920, memory devices or data stores as such terms are used within this disclosure.

Program instructions, software or interactive modules for providing the interface and performing any querying or analysis associated with one or more data sets may be stored in the memory device 920. Optionally, the program instructions may be stored on a tangible, non-transitory computer-readable medium such as a compact disk, a digital disk, flash memory, a memory card, a universal serial bus (USB) drive, an optical disc storage medium and/or other recording medium.

An optional display interface 930 may permit information from the bus 910 to be displayed on the display 935 in audio, visual, graphic or alphanumeric format. Communication with external devices may occur using various communication ports 940. A communication port 940 may be attached to a communications network, such as the Internet or an intranet.

The hardware may also include an interface 945 which allows for receipt of data from input devices such as a keypad 950 or other input device 955 such as a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also, that various presently unforeseen or unanticipated alternatives, modifications, variations or improvements therein may be subsequently made by those skilled in the art which are also intended to be encompassed by the following claims.

What is claimed is:

1. A method of generating electricity, the method comprising:

applying heat to a first external side of a reservoir of a thermal diffusion unit;

generating a thermal gradient across the reservoir by removing heat from an opposing second external side of the reservoir, whereby a cooler internal region is developed inside the reservoir and a warmer internal region is developed inside the reservoir;

using the thermal gradient to cause (i) solutes in a saline solution to move to the cooler internal region inside the reservoir and (ii) solvent molecules in the saline solution to accumulate in the warmer internal region inside the reservoir, resulting in separation of a first saline solution and a second saline solution within the reservoir, wherein the first saline solution is more concentrated with saline than the second saline solution;

drawing the first saline solution from the thermal diffusion unit;

drawing the second saline solution from the thermal diffusion unit; and feeding the first saline solution and the second saline solution into the power generator;

operating the power generator to:

receive the first saline solution and the second saline solution; and generate power by performing a controlled mixing of the first saline solution and the second saline solution;

drawing, from the power generator, a combined saline solution comprising the first saline solution mixed with the second saline solution; and feeding the combined saline solution to the thermal diffusion unit.

2. The method of claim 1, further comprising adding, as needed, makeup water to the reservoir.

3. The method of claim 1, wherein feeding the first saline solution and the second saline solution into the power generator comprises feeding the first saline solution and the second saline solution into a reverse electrodialysis unit.

4. The method of claim 1, further comprising applying a pressure-retarded osmosis (PRO) system.

5. The method of claim 1, wherein applying the heat to the reservoir comprises adding geothermal heat to the thermal diffusion unit.

6. The method of claim 1, wherein causing the power generator to generate power comprises causing the power generator to generate the electricity.

7. The method of claim 6, further comprising using a portion of the generated electricity to produce hydrogen gas through electrolysis.

8. The method of claim 1, wherein heat is added to or removed from the reservoir of the thermal diffusion unit by controlling a valve system comprising a multi- zone box to control temperature in multiple spaces.

* * * * *